United States Patent
Igasaki et al.

(10) Patent No.: US 7,209,279 B2
(45) Date of Patent: Apr. 24, 2007

(54) PHASE MODULATING APPARATUS AND PHASE MODULATING METHOD

(75) Inventors: Yasunori Igasaki, Hamamatsu (JP); Norihiro Fukuchi, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 10/493,464

(22) PCT Filed: Oct. 25, 2002

(86) PCT No.: PCT/JP02/11115

§ 371 (c)(1),
(2), (4) Date: Oct. 20, 2004

(87) PCT Pub. No.: WO03/036368

PCT Pub. Date: May 1, 2003

(65) Prior Publication Data

US 2005/0063032 A1   Mar. 24, 2005

(30) Foreign Application Priority Data

Oct. 25, 2001   (JP) .............................. 2001-328267

(51) Int. Cl.
*G02F 1/01* (2006.01)
(52) U.S. Cl. .................. 359/279; 359/290; 359/292; 355/67
(58) Field of Classification Search ............ 359/1, 359/11, 16, 22, 24, 270, 279, 237, 290, 291, 359/292, 223, 224, 578, 318, 281, 285, 855; 355/52, 53, 55, 67, 69, 77
See application file for complete search history.

(56) References Cited

U.S. PATENT DOCUMENTS 5,119,214 A    6/1992  Nishii et al.
5,589,955 A *  12/1996 Amako et al. ................. 359/9

FOREIGN PATENT DOCUMENTS

| EP | 1 136 872 A1 | 9/2001 |
|---|---|---|
| JP | A 4-294322 | 10/1992 |
| JP | A 6-138424 | 5/1994 |
| JP | A 6-208088 | 7/1994 |
| JP | A 7-66463 | 3/1995 |
| JP | A 9-134112 | 5/1997 |
| JP | B2 2785427 | 5/1998 |
| JP | A 10-186283 | 7/1998 |
| JP | A 11-272203 | 10/1999 |
| WO | WO 92/21050 | 11/1992 |
| WO | WO 99/66368 | 12/1999 |
| WO | WO 00/34823 | 6/2000 |

OTHER PUBLICATIONS

Itoh et al., "Reflect-Type, Highpower-Laser Pulse Shaping System its Operation Verified by Frequency Resolved Optical Gating," Laer Research vol. 28, No. 8, pp. 511-515, 2000.

* cited by examiner

*Primary Examiner*—Ricky Mack
*Assistant Examiner*—Tuyen Tra
(74) *Attorney, Agent, or Firm*—Oliff & Berridge, PLC

(57) ABSTRACT

An adder unit (60e) reads a desired CGH pattern from a pattern memory unit (60a) and a phase distortion correction pattern from a distortion-correction pattern memory unit (60d) and adds both patterns together to generate a phase distortion corrected pattern. A control unit (60g) controls a phase modulation module (40) in accordance with the phase distortion corrected pattern. Accordingly, phase-modulated light based on the desired phase pattern can be generated precisely, easily and quickly.

26 Claims, 15 Drawing Sheets

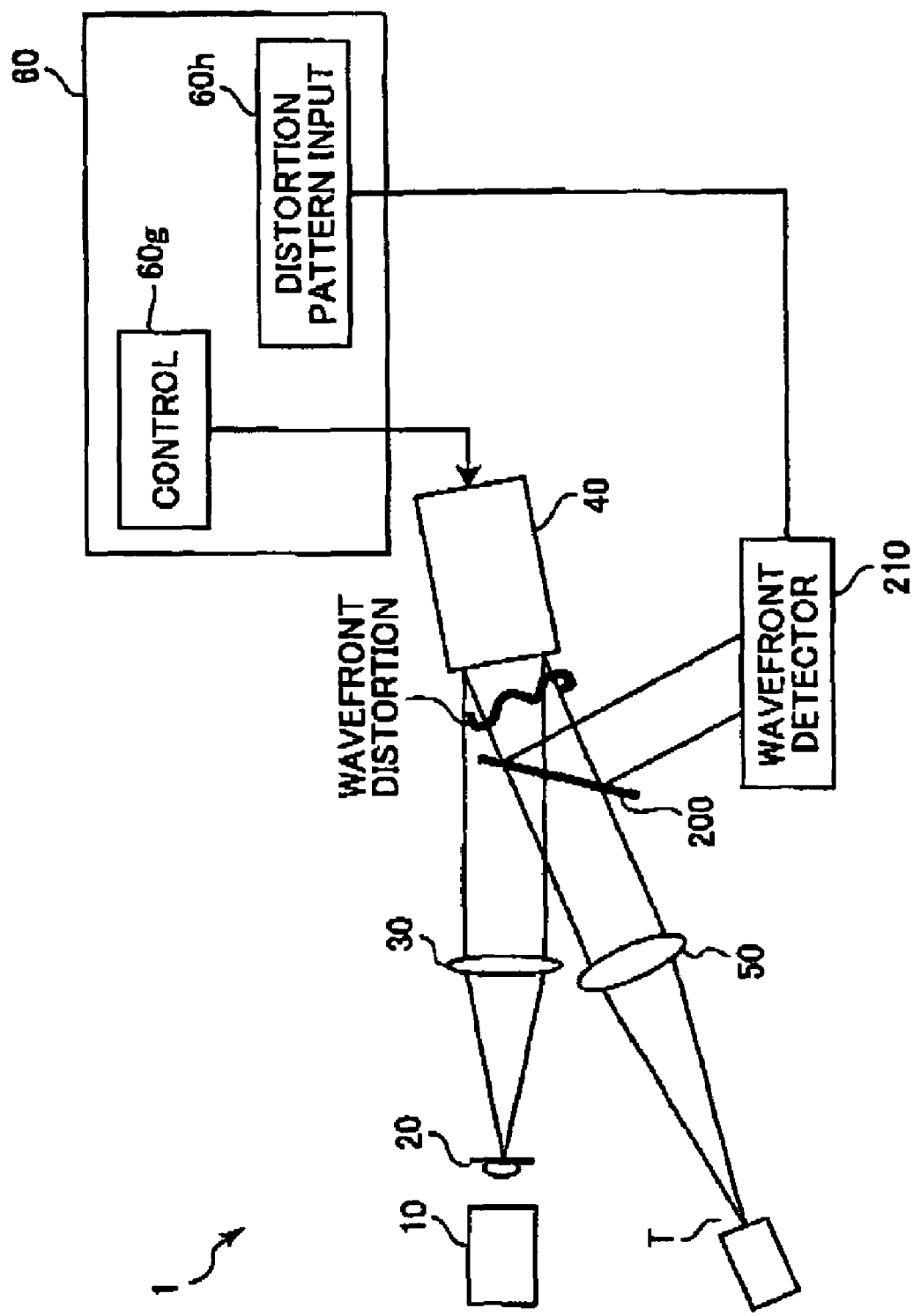

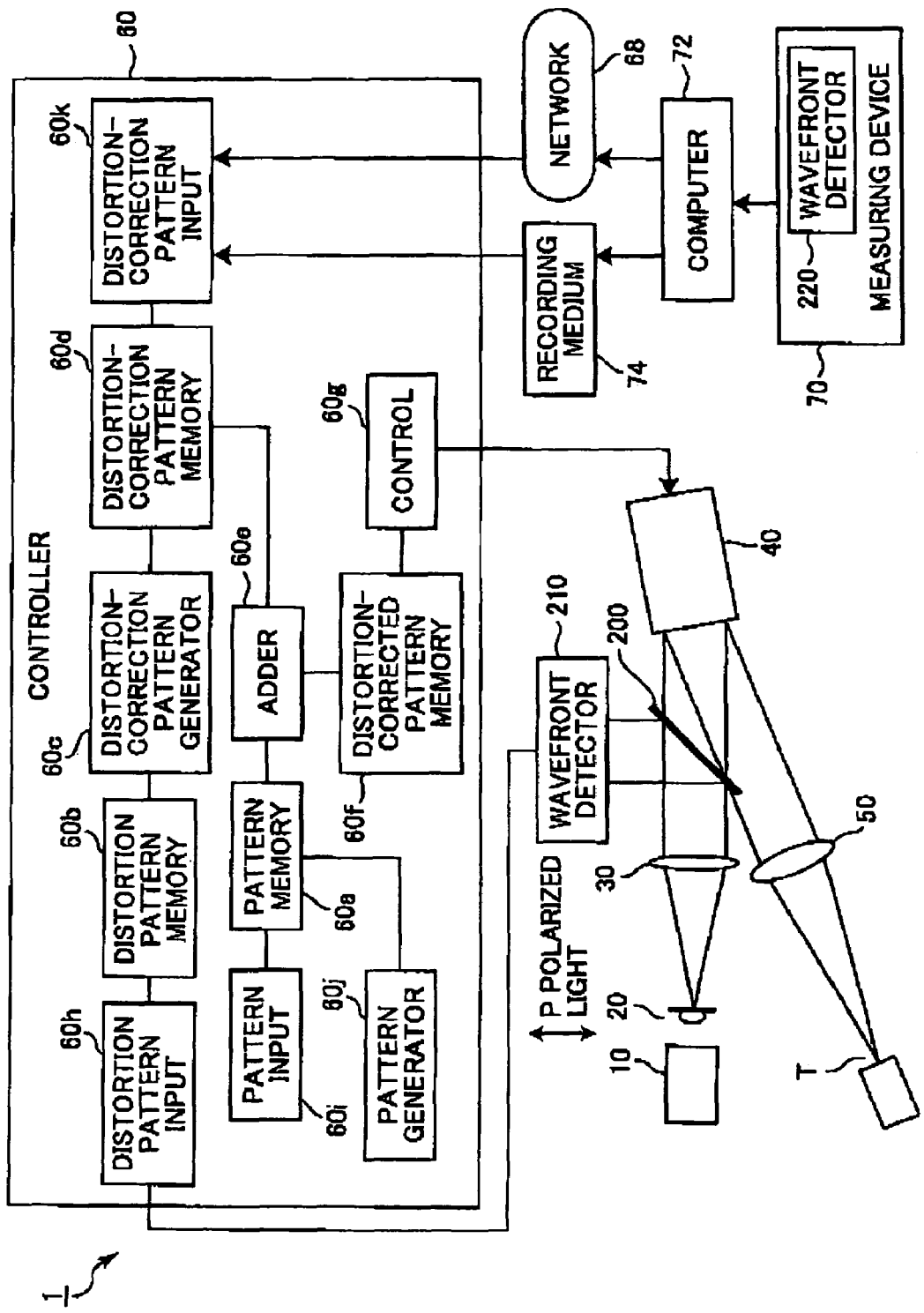

FOURIER-TRANSFORM PATTERN
(WAVEFRONT CORRECTED)

FOURIER-TRANSFORM PATTERN
(WAVEFRONT NOT CORRECTED)

PHASE MODULATING APPARATUS AND PHASE MODULATING METHOD

TECHNICAL FIELD

The present invention relates to a phase modulating apparatus, a phase modulating method, a program for performing the phase modulating method, and a recording medium in which the program is recorded. More particularly, the invention relates to a phase modulating apparatus and phase modulating method for modulating the phase of a laser beam by using a phase modulated spatial light modulator, a program for performing the phase modulating method, and a recording medium in which the program is recorded.

BACKGROUND ART

There has been proposed a phase modulating apparatus that uses a phase modulated spatial light modulator to modulate the phase of a laser beam in accordance with a phase pattern calculated by a computer. In the phase modulating apparatus, a phase pattern is written to the phase modulated spatial light modulator to be irradiated by a laser beam, so that phase modulation light modulated with the phase pattern is generated.

Japanese Patent No. 2,785,427 describes a method of modulating the phase and intensity of light by utilizing a TN-liquid-crystal spatial light-modulating element. In this method, a phase pattern to be displayed on the TN-liquid-crystal spatial light modulating element is formed in consideration of the phase distortion that occurs due to the drive voltage applied across the TN liquid-crystal.

DISCLOSURE OF THE INVENTION

In the case a phase modulating apparatus is provided with a laser light source, a phase modulated spatial light modulator, and an optical system for guiding a laser beam, phase-modulated light having a phase pattern different from the expected may be generated if any phase distortion is induced in the laser beam by the laser light source, the phase modulated spatial light modulator, or the optical system for guiding the laser beam.

Accordingly, an attempt to reduce the phase distortion is performed by assembling an expensive optical system, or improving the flatness of the substrate provided on the reading side of the phase modulated spatial light modulator.

In order to manufacture a phase modulated spatial light modulator that has a reading-side substrate with high flatness, expensive materials must be used, which makes manufacture of the spatial light modulator difficult. Consequently, the manufacturing cost is very high. This makes it difficult to mass-produce the phase modulating apparatus.

As described in Japanese unexamined patent application publication No. 10-186283, an output image generated with phase-modulated light is detected, and a phase modulated spatial light modulator is feedback-controlled based on the detected result. Accordingly, a nearly ideal output image is formed by compensating the characteristic displacement of the entire optical system.

According to the image-forming method disclosed in Japanese unexamined patent application publication No. 10-186283, the feedback loop must be repeated until a desired output image is obtained, which takes much time to generate the output image. In practice, the output image undergoes random fluctuation because of the changes in the light source. If the random fluctuation is detected together with the fluctuation inherent to the feedback control, it is substantially difficult to perform an accurate feedback control.

The present invention has been made to solve the problems described above. An object of the invention is to provide a phase modulating apparatus that can phase-modulate light in accordance with a desired phase pattern accurately, easily, and quickly.

Another object of the invention is to provide a phase modulating apparatus that can be manufactured at lower cost.

Further object of the invention is to provide a phase modulating method that can phase-modulate light in accordance with a desired phase pattern accurately, easily and quickly.

Still further object of the invention is to provide a program that can perform the above phase modulating method and a recording medium that stores the program.

In order to accomplish the above objects, the present invention is characterized by a phase modulating apparatus including: a light source that emits light; adding means that adds a desired phase pattern and a wavefront-distortion correction phase pattern for correcting the wavefront distortion of the light in order to generate a distortion corrected phase pattern; and an electrically-addressed phase modulated spatial light modulator that phase-modulates the light in accordance with the distortion corrected phase pattern. When a sum of the desired phase pattern and the wavefront-distortion correction phase pattern has a negative value or a value equal to or more than $2\pi$, the adding means generates a remainder obtained by dividing the sum by $2\pi$ as the distortion corrected phase pattern.

In the present invention, the wavefront-distortion correction phase pattern for correcting the wavefront distortion and the desired phase pattern are prepared separately from each other. These patterns are then added together to generate a wavefront-distortion corrected phase pattern. Then, the electrically-addressed phase modulated spatial light modulator is driven in accordance with the wavefront-distortion corrected phase pattern. It is possible to phase-modulate light without light distortion being corrected by using the desired phase pattern precisely. Since the wavefront-distortion correction phase pattern for correcting the wavefront distortion and the desired phase pattern are added together, the apparatus can have a simple configuration to generate the wavefront-distortion corrected pattern within a short time. Hence, the phase modulating apparatus according to the present invention can perform a real time control and be manufactured at lower cost.

Preferably, the wavefront-distortion correction phase pattern includes a phase pattern generated by inverting a sign of a wavefront distortion phase pattern indicating the wavefront distortion of the light. The wavefront distortion can be reliably corrected, because the wavefront-distortion correction phase pattern is generated by inverting the sign of the wavefront-distortion phase pattern.

When a phase value obtained by adding the desired phase pattern and the wavefront-distortion correction phase pattern has a negative value or a value equal to or greater than $2\pi$, the adding means generates a remainder obtained by dividing the phase value by $2\pi$ as the distortion corrected phase pattern. To find the remainder obtained by dividing the negative value of the phase value by $2\pi$, it is sufficient to determine the absolute value of the negative value and find a minimum positive value such that the sum of the absolute value and the minimum positive value equal an integral multiple of 2π. When the sum of the desired phase pattern and the wavefront-distortion correction phase pattern has a negative value or a value equal to or greater than 2π, the remainder obtained by dividing the sum by 2π is generated as the distortion corrected phase pattern. Therefore, even if the electrically-addressed phase modulated spatial light modulator has no ability to perform phase modulation on light having more phase modulation amount than 2π, the electrically-addressed phase modulated spatial light modulator can perform phase modulation on a phase value, i.e., the remainder obtained by dividing the sum by 2π. Thus, by performing phase modulation on the remainder, the apparatus is considered to perform phase modulation on a phase value equal to or greater than 2π.

Preferably, a phase modulating apparatus of the present invention further includes storing means that stores the wavefront-distortion correction phase pattern. The adding means reads the wavefront-distortion correction phase pattern from the storing means and then adds the wavefront-distortion correction phase pattern to the desired phase pattern.

Since the wavefront-distortion correction phase pattern is stored, the wavefront-distortion corrected phase pattern can be generated merely by reading the wavefront-distortion correction phase pattern and adding it to the desired phase pattern. The wavefront-distortion corrected phase pattern can be therefore generated within a short time.

In this case, it is preferable that the phase modulating apparatus of the invention has holding a means that holds the desired phase pattern in advance. The adding means reads the desired phase pattern and the wavefront-distortion correction phase pattern individually and adds them together to generate a wavefront-distortion corrected phase pattern. Therefore, it is possible to generate the wavefront-distortion corrected phase pattern within a short time.

Alternatively, the phase modulating apparatus of the invention may have a means for generating a desired phase pattern. In this case, the adding means generates a wavefront-distortion corrected phase pattern merely by adding the desired phase pattern and the read wavefront-distortion correction phase pattern. Accordingly, it is possible to generate a wavefront-distortion corrected phase pattern for any phase pattern within a short time.

A phase modulating apparatus according to the present invention further includes input means that receives the wavefront-distortion correction phase pattern. The adding means adds the received wavefront-distortion correction phase pattern to the desired phase pattern. A wavefront-distortion corrected phase pattern can be generated merely by adding the received wavefront-distortion correction phase pattern to the desired phase pattern. Accordingly, the wavefront-distortion corrected phase pattern can be generated within a short time.

A phase modulating apparatus according to the present invention includes a light source that emits light; adding means that adds a desired phase pattern and a wavefront-distortion correction phase pattern for correcting wavefront-distortion of the light in order to generate a distortion corrected phase pattern; an electrically-addressed phase modulated spatial light modulator that phase-modulates the light in accordance with the distortion corrected phase pattern; measuring means that optically measures the wavefront distortion of the light in order to generate the wavefront-distortion phase pattern indicating the wavefront distortion; and generating means that inverts a sign of the wavefront-distortion phase pattern in order to generate the wavefront-distortion correction phase pattern. The wavefront-distortion correction phase pattern can be generated merely by measuring the wavefront distortion and then inverting the sign of this distortion. Accordingly, any complex computation is not necessary. And, the wavefront-distortion correction phase pattern can be quickly obtained at high precision. In addition, the wavefront-distortion correction phase pattern can be easily generated independently of the desired phase pattern.

In this case, preferably, the measuring means repeats measurement of the wavefront distortion of the light in order to generate the wavefront-distortion phase pattern that indicates the wavefront distortion. The generating means inverts a sign of the wavefront-distortion phase pattern to generate the wavefront-distortion correction phase pattern, every time the measuring means measures the wavefront distortion of the light. The adding means adds the wavefront-distortion correction phase pattern to the desired phase pattern in order to renew the wavefront-distortion corrected phase pattern, every time the generating means generates the wavefront-distortion correction phase pattern. The electrically-addressed phase modulated spatial light modulator phase-modulates the light in accordance with the renewed distortion corrected phase pattern repeatedly.

A dynamic wavefront distortion as well as a static wavefront distortion can be measured in real time, so that it is possible to generate a wavefront-distortion correction phase pattern that can correct a lot of types of wavefront distortion containing a dynamic distortion. Thus, phase-modulated light can be generated at high precision.

In the case, the phase modulating apparatus of the present invention has a holding means that holds the desired phase pattern beforehand, the adding means reads the desired phase pattern from the holding means and then adds it to the wavefront-distortion correction phase pattern which is repeatedly generated, thereby renewing the wavefront-distortion corrected phase pattern repeatedly. Accordingly, it is possible to precisely generate phase-modulated light with the wavefront-distortion containing a dynamic distortion component being corrected. In the case the phase modulating apparatus of the present invention has a means for generating a desired pattern, the adding means adds the generated desired phase pattern to the wavefront-distortion correction phase pattern repeatedly generated, thereby renewing the wavefront-distortion corrected phase pattern. Thus, it is possible to generate phase-modulated light with the wavefront-distortion containing a dynamic distortion component being corrected.

The electrically-addressed phase modulated spatial light modulator has an input/output surface to receive and emit the light therethrough. The wavefront-distortion correction phase pattern includes a phase pattern for correcting the wavefront distortion of the light induced by the input/output surface. High-precision phase modulation can be accomplished by correcting the wavefront distortion of light induced by the input/output surface of the electrically-addressed phase modulated spatial light modulator.

In this case, it is preferable that the wavefront-distortion correction phase pattern is generated by inverting a sign of the wavefront-distortion phase pattern that indicates the wavefront distortion of the light emitted from the input/output surface of the electrically-addressed phase modulated spatial light modulator which is not driven. According to the wavefront-distortion correction phase pattern, the wavefront distortion induced by the input/output surface of the electrically-addressed phase modulated spatial light modulator that is driven to generate a desired phase pattern can be corrected among the wavefront distortions of the light emerging from the input/output surface.

In this case, preferably, a phase modulating apparatus according to the present invention further includes a first optical component that guides the light emitted from the light source to the input/output surface of the electrically-addressed phase modulated spatial light modulator. In this apparatus, the electrically-addressed phase modulated spatial light modulator has the input/output surface which the light impinges on or emerges from. The wavefront-distortion correction phase pattern includes a phase pattern for correcting the wavefront distortion of the light induced by at least one of the light source, the input/output surface of the electrically-addressed phase modulated spatial light modulator, and first optical component. High-precision phase modulation can be achieved, because the wavefront distortion of light induced by one or more of the optical components constituting the phase modulating apparatus can be corrected.

In this case, it is preferable that the wavefront-distortion correction phase pattern includes a phase pattern generated by inverting a sign of the wavefront-distortion phase pattern indicating the wavefront distortion of the light induced by at least one of the light source, the input/output surface of the electrically-addressed phase modulated spatial light modulator, and the first optical component. Since the wavefront-distortion correction phase pattern is generated by inverting the sign of the wavefront-distortion phase pattern, the wavefront distortion of light can be reliably corrected. Note that the wavefront-distortion correction phase pattern can be obtained by measuring the wavefront distortion induced by one or more of the input/output surface of the electrically-addressed phase modulated spatial light modulator, the light source, and the first optical component.

When a phase modulating apparatus according to the present invention includes a second optical component that guides the light emerging from the input/output surface of the electrically-addressed phase modulated spatial light modulator, it is preferable that the wavefront-distortion correction phase pattern includes a phase pattern for correcting the wavefront distortion of the light induced by at least one of the light source, the input/output surface of the electrically-addressed phase modulated spatial light modulator, the first optical component, and the second optical component. Phase modulation of higher precision can be achieved, because the wavefront distortion of light induced with one or more of the optical components constituting the phase modulating apparatus can be corrected.

For example, if the wavefront-distortion correction phase pattern is for correcting the wavefront distortion of light induced by all optical components constituting the phase modulating apparatus, phase modulation of higher precision can be accomplished.

In this case, it is preferable that the wavefront-distortion correction phase pattern includes a phase pattern generated by inverting a sign of the wavefront-distortion phase pattern indicating the wavefront distortion of the light induced by at least one of the light source, the input/output surface of the electrically-addressed phase modulated spatial light modulator, the first optical component and the second optical component. Since the wavefront-distortion correction phase pattern is generated by inverting the sign of the wavefront-distortion phase pattern, the wavefront distortion of light can be reliably corrected. Note that the wavefront-distortion phase pattern is obtained by measuring the wavefront distortion of light induced by one or more of the input/output surface of the electrically-addressed phase modulated spatial light modulator, the light source, the first optical component, and the second optical component together.

Alternatively, it is preferable that the wavefront-distortion correction phase pattern includes at least one of a first wavefront-distortion correction phase pattern for correcting the wavefront distortion induced by the input/output surface of the electrically-addressed phase modulated spatial light modulator, a second wavefront-distortion correction phase pattern for correcting the wavefront distortion induced by the light source, and a third wavefront-distortion correction phase pattern for correcting the wavefront distortion induced by the first optical component. The adding means adds at least one of the first, second, and third wavefront-distortion correction phase patterns to the desired phase pattern in order to generate a distortion corrected phase pattern. The wavefront distortion of light induced by one or more of the optical components constituting the phase modulating apparatus can be corrected merely by adding one or more of the first to third wavefront-distortion correction phase patterns to the desired phase pattern.

In this case, it is preferable that the first wavefront-distortion correction phase pattern includes a phase pattern generated by inverting a sign of a wavefront-distortion phase pattern indicating the wavefront distortion induced by the input/output surface of the electrically-addressed phase modulated spatial light modulator. It is preferable that the second wavefront-distortion correction phase pattern includes a phase pattern generated by inverting a sign of a wavefront-distortion phase pattern indicating the wavefront distortion induced by the light source. It is preferable that the third wavefront-distortion correction phase pattern includes a phase pattern generated by inverting a sign of a wavefront-distortion phase pattern indicating the wavefront distortion induced by the first optical component. Since each wavefront-distortion correction phase pattern is generated by inverting the sign of the wavefront-distortion phase pattern, the wavefront distortion of light can be reliably corrected. Note that each wavefront-distortion phase pattern can be obtained by measuring the wavefront distortion of light induced by the corresponding optical component.

For example, preferably, a first wavefront-distortion correction phase pattern is generated by inverting a sign of a wavefront-distortion phase pattern indicating the wavefront distortion of the light induced by the input/output surface of the electrically-addressed phase modulated spatial light modulator. A fourth wavefront-distortion phase pattern is generated by inverting a sign of a wavefront-distortion correction phase pattern indicating the wavefront distortion of the light induced by the light source and the first optical component. The adding means adds the first wavefront-distortion correction phase pattern and the fourth wavefront-distortion phase pattern to the desired phase pattern in order to generate the distortion corrected phase pattern. The wavefront distortion of light induced by the input/output surface of the electrically-addressed phase modulated spatial light modulator, the light source, and the first optical component can be corrected merely by adding the first wavefront-distortion correction phase pattern and the fourth wavefront-distortion correction phase pattern to the desired phase pattern.

In this case, it is preferable that a phase modulating apparatus according to the present invention further includes input means that receives a first wavefront-distortion correction phase pattern generated by inverting a sign of a wavefront-distortion phase pattern indicating wavefront distortion of light emitted from the input/output surface of the electrically-addressed phase modulated spatial light modulator which is not driven. The apparatus includes storing means that stores the first wavefront-distortion phase pattern. The measuring means includes distortion measuring means that measures the wavefront distortion of the light induced by the light source and the first optical component in order to generate a wavefront-distortion phase pattern that indicates the wavefront distortion. The generating means includes pattern generating means that inverts the sign of the wavefront-distortion phase pattern in order to generate the fourth wavefront-distortion correction phase pattern. The adding means adds the first and the fourth wavefront-distortion correction phase patterns to the desired phase pattern in order to generate the distortion corrected phase pattern.

The fourth wavefront-distortion correction phase pattern can be generated by only inverting the sign of the wavefront-distortion phase pattern indicating the wavefront distortion of light induced by the light source and the first optical component. Hence, the wavefront distortion of light induced by the light source, the first optical component, and the input/output surface of the electrically-addressed phase modulated spatial light modulator can be corrected merely by adding the fourth wavefront-distortion correction phase pattern and first wavefront-distortion correction phase pattern to the desired phase pattern.

In this case, the distortion measuring means repeats measurement of the wavefront distortion of the light induced by the light source and the first optical component to repeatedly generate a wavefront-distortion phase pattern indicating the wavefront distortion. The pattern generating means inverts a sing of the wavefront-distortion phase pattern to repeatedly generate the fourth wavefront-distortion correction phase pattern. The adder means adds the repeatedly generated fourth wavefront-distortion correction phase pattern and the first wavefront-distortion correction phase pattern to the desired phase pattern to repeatedly renew the wavefront-distortion corrected phase pattern. The electrically-addressed phase modulated spatial light modulator phase-modulates the light in accordance with the repeatedly renewed distortion corrected phase pattern.

A phase modulating apparatus according to the present invention includes a light source that emits light; adding means that adds a desired phase pattern and a wavefront-distortion correction phase pattern for correcting wavefront-distortion of the light in order to generate a distortion corrected phase pattern; and an electrically-addressed phase modulated spatial light modulator that phase-modulates the light in accordance with the distortion corrected phase pattern. The electrically-addressed phase modulated spatial light modulator includes a reflective type of phase modulated spatial light modulator.

The present invention provides a phase modulating method including: providing a desired phase pattern; providing a wavefront-distortion correction phase pattern for correcting a wavefront distortion of light; adding the desired phase pattern to the wavefront-distortion correction phase pattern in order to generate a distortion corrected phase pattern; and phase-modulating the light by driving an electrically-addressed phase modulated spatial light modulator in accordance with the distortion corrected phase pattern. When a sum of the desired phase pattern and the wavefront-distortion correction phase pattern has a negative value of a value equal to or more than $2\pi$, a remainder obtained by dividing the sum by $2\pi$ is generated as the distortion corrected phase pattern in the step of adding.

According to the present invention, a wavefront-distortion correction phase pattern for correcting wavefront distortion and a desired phase pattern are prepared separately from each other to add them together, thereby generating a wavefront-distortion corrected phase pattern. The wavefront-distortion corrected phase pattern is used to drive the electrically-addressed phase modulated spatial light modulator. Thus, light phase-modulated with the desired phase pattern can be generated precisely with the wavefront distortion being corrected. In addition, the wavefront-distortion corrected phase pattern can be easily generated within a short time merely by adding the wavefront-distortion correction phase pattern and the desired phase pattern together.

It is preferable that the providing the wavefront-distortion correction phase pattern includes: inverting a sign of the wavefront-distortion phase pattern indicating phase of the wavefront distortion of the light in order to generate the wavefront-distortion correction phase pattern. Since the wavefront-distortion correction phase pattern can be generated merely by inverting the sign of the wavefront-distortion phase pattern, complex computation is not necessary. Accordingly, the wavefront-distortion correction phase pattern can be fast generated.

In this case, it is preferable that the providing a wavefront-distortion correction phase pattern includes: receiving the wavefront-distortion correction phase pattern. The adding includes adding the received wavefront-distortion correction phase pattern to the desired phase pattern. The wavefront-distortion corrected phase pattern can be generated merely by adding the received wavefront-distortion correction phase pattern to the desired phase pattern, so that the wavefront-distortion corrected phase pattern can be generated quickly.

A phase modulating method of the present invention includes providing a desired pattern; providing a wavefront-distortion correction phase pattern for correcting a wavefront distortion of light; adding the desire pattern to the wavefront-distortion correction phase pattern to generated a distortion corrected phase pattern; and phase-modulating the light by driving an electrically-addressed phase modulated spatial light modulator in accordance with the distortion corrected phase pattern. The providing the wavefront-distortion correction phase pattern includes; measuring the wavefront distortion of the light optically and generating the wavefront-distortion phase pattern indicating the wavefront distortion; and inverting a sign of the wavefront distortion phase pattern in order to generate the wavefront-distortion correction phase pattern. The adding includes adding the generated wavefront-distortion correction phase pattern to the desired phase pattern. The wavefront-distortion correction phase pattern can be generated merely by measuring the wavefront distortion and then inverting the sign thereof. Hence, complex computation is not necessary, so that the wavefront-distortion correction phase pattern can be obtained easily and fast.

In this case, the measuring includes repeating measurement of the wavefront distortion of the light in order to generate a wavefront distortion phase pattern indicating the wavefront distortion. The inverting includes inverting a sign of the wavefront distortion phase pattern, thereby repeatedly generating the wavefront-distortion correction phase pattern. The adding includes repeatedly adding the wavefront-distortion correction phase pattern, thereby repeatedly renewing the wavefront-distortion corrected phase pattern. Tthe phase-modulating includes repeatedly driving the electrically-addressed phase modulated spatial light modulator in accordance with the renewed distortion corrected phase pattern repeatedly, thereby phase-modulating the light. Not only the static wavefront distortion but also the dynamic wavefront distortion can be measured in real time. Accordingly, it is possible to generate a wavefront-distortion correction phase pattern that corrects different types of wavefront distortion including a dynamic wavefront distortion. Phase-modulated light of higher precision can therefore be generated.

Preferably, the measuring includes measuring wavefront distortion of light emitted from the input/output surface of the electrically-addressed phase modulated spatial light modulator which is not driven, and the inverting includes inverting the sign of a wavefront distortion phase pattern indicating the measured wavefront distortion, thereby generating a first wavefront-distortion correction phase pattern. The adding includes adding the first wavefront-distortion correction pattern to the desired phase pattern, thereby generating the distortion corrected phase pattern.

The first wavefront-distortion correction phase pattern can be generated only by inverting the sign of the wavefront-distortion phase pattern that indicates the wavefront-distortion of the light emitted from the input/output surface of the electrically-addressed phase modulated spatial light modulator which is not driven. The first wavefront-distortion correction phase pattern is added to the desired phase pattern, so that it is possible to correct the wavefront distortion of the light induced by the input/output surface of the modulator among the wavefront distortion of the light emitted from the input/output surface of the electrically-addressed phase modulated spatial light modulator which is driven in order to generate a desired phase pattern.

In this case, preferably, the providning a wavefront-distortion correction phase pattern further includes: receiving a first wavefront distortion correction phase pattern obtained by inverting a sign of a wavefront distortion phase pattern indicating the wavefront distortion of the light emerging from the input/output surface of the electrically-addressed phase modulated spatial light modulator which is not driven; storing the first wavefront distortion correction phase pattern into the storing means; measuring wavefront distortion of light induced by a light source and the first optical component; and inverting a sign of a wavefront distortion phase pattern indicating the measured wavefront distortion, thereby generating a second wavefront-distortion correction phase pattern. The adding includes adding the first wavefront-distortion correction phase pattern and the second wavefront-distortion correction phase pattern to the desired phase pattern, thereby the distortion corrected phase pattern. The phase-modulating includes phase-modulating the light from the light source by guiding the light to the electrically-addressed phase modulated spatial light modulator through the first optical component and then driving the electrically-addressed phase modulated spatial light modulator in accordance with the distortion corrected phase pattern.

The second wavefront-distortion correction phase pattern can be generated merely by inverting the sign of the wavefront-distortion phase pattern indicating the wavefront distortion of light induced by the light source and the first optical component. Hence, the wavefront distortion of light induced by the light source, the first optical component, and the input/output surface of the electrically-addressed phase modulated spatial light modulator can be corrected merely by adding the second wavefront-distortion correction phase pattern and the first wavefront-distortion correction phase pattern to the desired phase pattern.

In this case, the measuring includes repeating measurement of the wavefront distortion of the light in order to repeatedly generate a wavefront distortion phase pattern indicating the wavefront distortion. The inverting includes inverting a sign of the wavefront distortion phase pattern, thereby repeatedly generating the wavefront-distortion correction phase pattern. The adding includes repeatedly adding the wavefront-distortion correction phase pattern, thereby repeatedly renewing the wavefront-distortion corrected phase pattern. The phase-modulating includes repeatedly driving the electrically-addressed phase modulated spatial light modulator in accordance with the renewed distortion corrected phase pattern repeatedly, thereby phase-modulating the light.

The present invention provides a program executed by a computer including: a process of preparing a desired phase pattern; a process of preparing a wavefront-distortion correction phase pattern for correcting a wavefront distortion of light; and a process of adding the desired phase pattern and the wavefront-distortion correction phase pattern, thereby generating a distortion corrected phase pattern. When a sum of the desired phase pattern and the wavefront-distortion correction phase pattern has a negative value or a value equal to or more than $2\pi$, a remainder obtained by dividing the sum by $2\pi$ is generated as the distortion corrected phase pattern.

The computer executes the program to only add the wavefront-distortion correction phase pattern to the desired phase pattern, thereby obtaining a wavefront-distortion corrected phase pattern. Accordingly, the wavefront-distortion corrected phase pattern can be quickly generated by performing simple computation.

It is preferable that a program according to the present invention further includes a process of inverting a sign of a wavefront-distortion phase pattern indicating a phase of the wavefront distortion of the light, thereby generating the wavefront-distortion correction phase pattern. Since the wavefront-distortion correction phase pattern can be generated merely by inverting the sign of the wavefront-distortion phase pattern, no complex computation is required. The wavefront-distortion correction phase pattern can be quickly generated.

The present invention provides a computer-readable recording medium storing a program executed by a computer storing: a process of preparing a desired phase pattern; a process of preparing a wavefront-distortion correction phase pattern for correcting a wavefront distortion of light; and a process of adding the desired phase pattern to the wavefront-distortion correction phase pattern, thereby generating a distortion corrected phase pattern. When a sum of the desired phase pattern and the wavefront-distortion correction phase pattern has a negative value or a value equal to or more than $2\pi$, a remainder obtained by dividing the sum by $2\pi$ is generated as the distortion corrected phase pattern. When the computer reads the program from the recording medium of the present invention, the computer can fast and accurately generate a wavefront-distortion correction phase pattern that serves to phase-modulate the light.

Preferably, a recording medium according to the present invention further stores a computer program to perform a process of inverting the sign of a wavefront-distortion phase pattern indicating the phase of the wavefront distortion of the light, thereby generating the wavefront-distortion correction phase pattern. The computer can generate a wavefront-distortion correction phase pattern merely by inverting the sign of the wavefront-distortion phase pattern Hence, no complex computation is required. Accordingly, the wavefront-distortion correction phase pattern can be quickly generated.

Alternatively, it is desired that the recording medium according to the present invention stores the wavefront-distortion correction phase pattern data. Then, the computer can fast perform the process of adding the wavefront-distortion correction phase pattern to the desired phase pattern, when the computer reads the program and the wavefront-distortion correction phase pattern data.

BRIEF DESCRIPTION OF THE DRAWINGS

FIG. 10 is a block diagram explaining that a beam sampler and a wavefront detector are arranged in a laser process apparatus to generate a distortion correction pattern in the second modification of the first embodiment of the invention;

FIG. 13 is a block diagram illustrating the configuration and function of a laser process apparatus according to a third embodiment of the present invention;

BEST MODE FOR CARRYING OUT THE INVENTION

Hereinafter, preferred embodiments of a phase modulating apparatus and a phase modulating method of according to the present invention will be described, with reference to the accompanying drawings.

The identical elements are designated by the same reference symbol in the figures and will not be repeatedly described.

(First Embodiment)

A laser process apparatus and a laser process method, both according to the first embodiment of the invention, will be described with reference to FIGS. 1 to 9(B).

The present embodiment relates to a laser process apparatus and a laser process method, in which a process target T is processed by a laser beam to be formed with any desired pattern.

Figure 1:
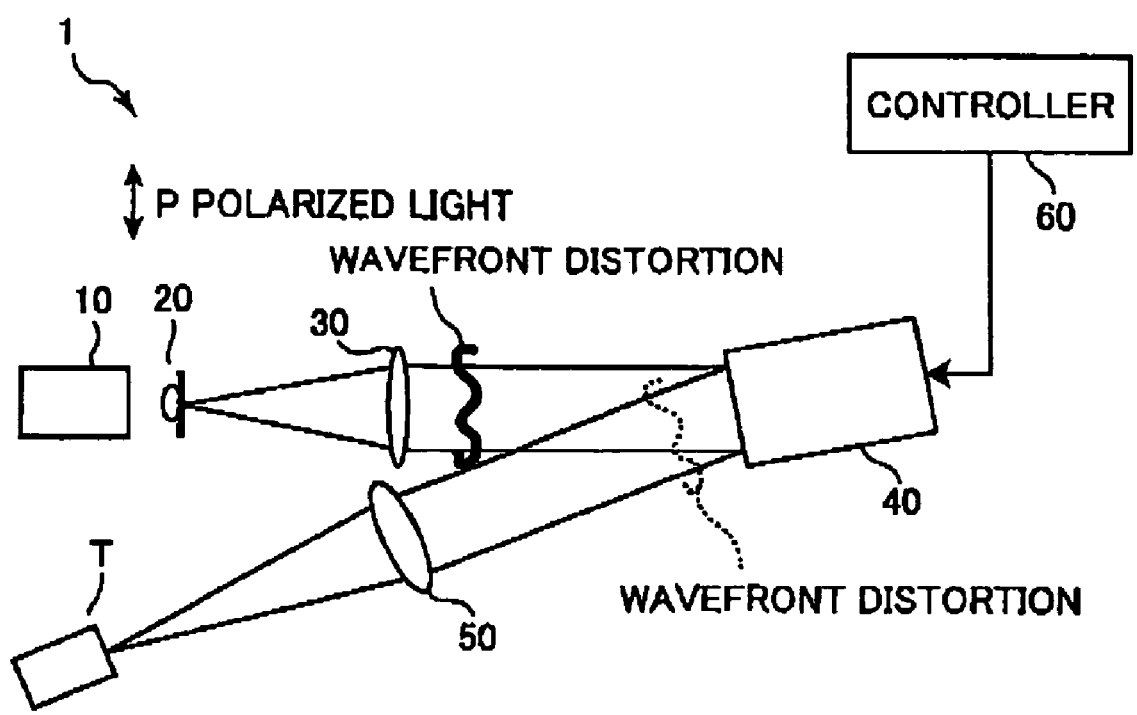
FIG. 1 is a block diagram showing the configuration of a laser process apparatus according to a first embodiment of the present invention.

As shown in FIG. 1, the laser process apparatus 1 according to the first embodiment includes a reading light source 10, a spatial filter 20, a collimate lens 30, a phase modulation module 40, a Fourier lens 50, and a controller 60.

The reading light source 10 is constituted by an He—Ne laser to generate coherent reading light. The reading light emitted from the reading light source 10 has an almost uniform phase distribution in the cross section. The reading light is a linear polarization having a polarization plane parallel to the plane of FIG. 1.

The spatial filter 20 removes excessive diffracted waves and excessive reflected waves from the reading light. The spatial filter 20 also removes diffracted and scattered waves generated due to flaws and dust from the reading light.

The collimate lens 30 collimates the reading light emerging from the spatial filter 20 to generate parallel reading light.

The phase modulation module 40 is an electrically-addressed phase modulated spatial light modulator to perform phase modulation on the reading light coming from the collimate lens 30.

The Fourier lens 50 performs spatial Fourier transform on the reading light that has been phase-modulated by the phase modulation module 40. The process target T is positioned on the Fourier plane of the Fourier lens 50. Hence, the reading light is first guided from the light source 10 to the phase modulation module 40 through the spatial filter 20 and the collimate lens 30. The reading light is then guided from the phase modulation module 40 to the process target T through the Fourier lens 50.

The controller 60 includes a personal computer to control the phase modulation module 40.

Figure 2:
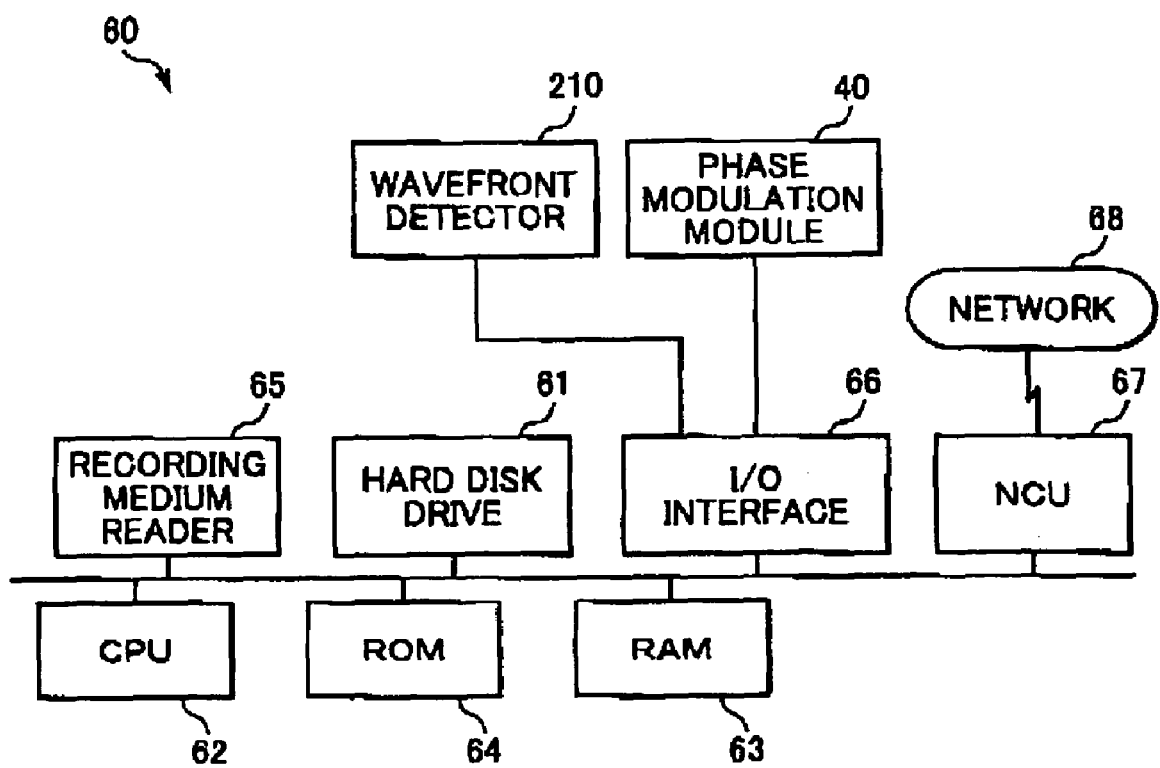
FIG. 2 is a block diagram of a controller provided in the laser process apparatus of FIG. 1.

As shown in FIG. 2, the controller 60 includes a hard disk drive 61, a CPU 62, a ROM 64, a RAM 63, a reading device 65 for reading data from a recording medium, an input/output (I/O) interface 66, and a network control unit (NCU) 67, which are connected to each other through a bus.

The hard disk drive 61 stores a program for generating distortion correction patterns, a program for generating distortion corrected patterns, and a program for driving the module in advance. These programs will be described later.

The CPU 62 controls all operations of the controller 60 to executes various programs, such as the program for generating distortion correction patterns, the program for generating distortion corrected patterns, and the program for driving the module.

The RAM 63 is provided to store the data that the CPU 62 generates when the CPU 62 executes any program.

The ROM 64 stores various programs and data. The ROM 64 may store the program for generating distortion correction patterns, the program for generating distortion corrected patterns, and the program for driving the module.

The reading device 65 is configured to read programs and data from a recording medium such as a flexible disk, a CD-ROM and a DVD to store the programs and data in the hard disk drive 61. For example, the program for generating distortion correction patterns and the program for generating distortion corrected patterns are stored in a recording medium such as a flexible disk, a CD-ROM or a DVD. In this case, the reading device 65 reads the programs from the recording medium to store the programs in the hard disk drive 61.

The phase modulation module 40 is connected to the input/output (I/O) interface 66. A wavefront detector 210 (FIG. 8), which will be described later, can be connected to the input/output (I/O) interface 66. Further, an input device (not shown) such as a keyboard and a mouse, and an output device (not shown) such as a display and a printer are connected to the input/output (I/O) interface 66.

A network 68 such as the Internet is connected to the network control unit. Accordingly, it is possible to download the program for generating distortion correction patterns and the program for generating distortion corrected patterns from the network 68 such as the Internet and store these programs in the hard disk drive 61.

The phase modulation module 40 will be described, with reference to FIG. 3.

Figure 3:
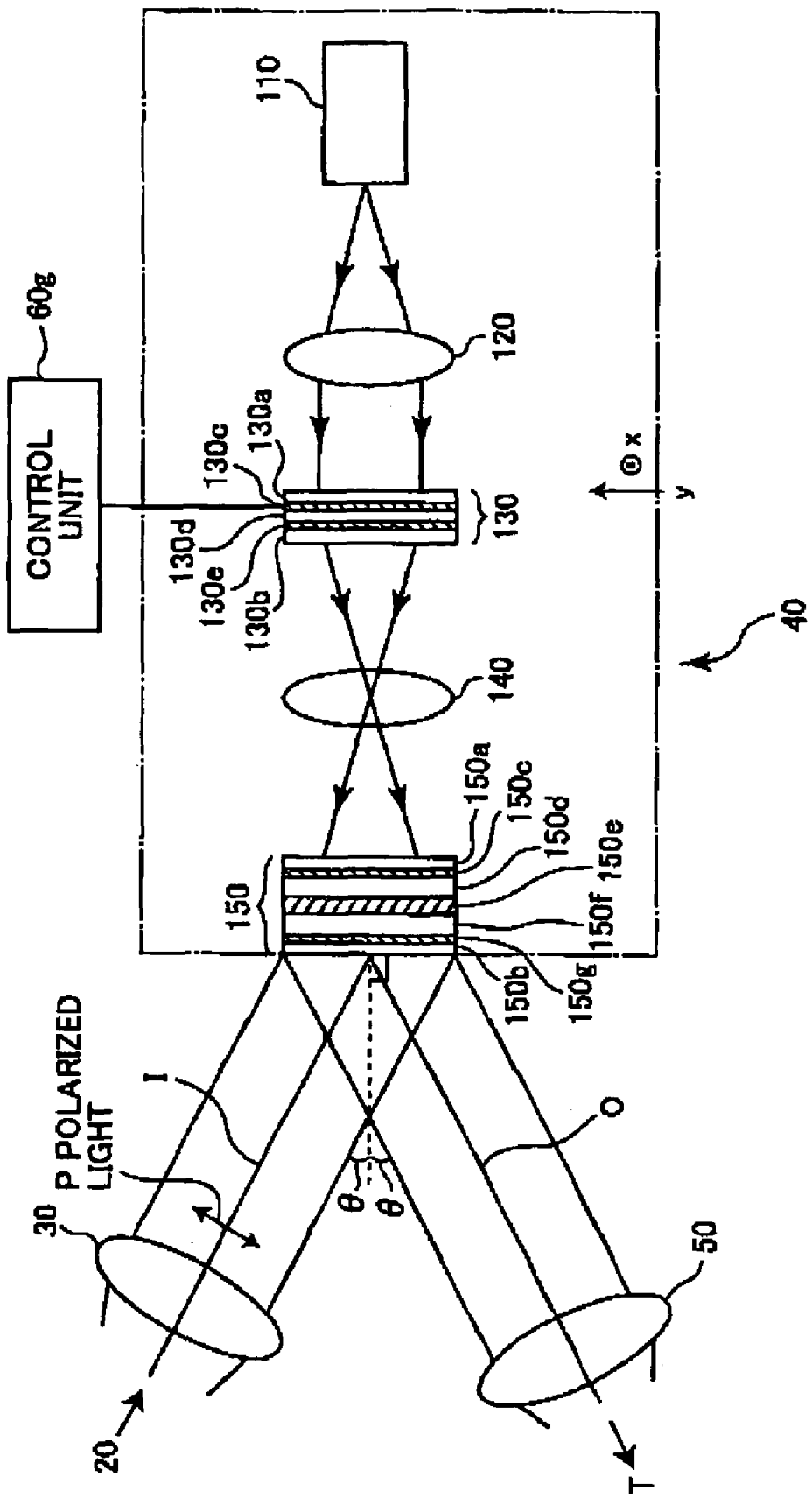
FIG. 3 is a diagram showing the configuration of the phase modulation module incorporated in the laser process apparatus of FIG. 1.

As shown in FIG. 3, the phase modulation module 40 includes a writing light source 110, a collimate lens 120, a liquid-crystal display (referred to as "LCD" hereinafter) 130, a relay lens 140, and a parallel-aligned nematic-liquid-crystal spatial light modulator (referred to as "PAL-SLM" hereinafter) 150.

The writing light source 110 is designed to generate writing light that has a uniform intensity distribution in the cross section. For example, the writing light source 110 is constituted by a laser diode (LD).

The collimate lens 120 collimates the writing light emerging from the writing light source 110 to generate parallel light.

The LCD 130 is a transmission type of electrically-addressed intensity modulated spatial light modulator. When electrically driven with a desired pattern in an addressing mode, the LCD 130 intensity-modulates the writing light emerging from the collimate lens 120 to generate intensity-modulated light that has intensity distribution of a desired pattern in the cross section.

The LCD 130 is composed of a light-receiving layer 130a, a light-transmitting layer 130b, a pixel assembly layer 130c, a twist nematic liquid-crystal layer 130d, and a facing electrode layer 130e. The pixel assembly layer 130c is interposed between the light-receiving layer 130a and the light-transmitting layer 130b. The light-receiving layer 130a is formed of a transparent glass substrate and a polarizing plate on the outer surface of the glass plate. Similarly, the light-transmitting layer 130b is formed of a transparent glass substrate and a polarizing plate on the outer surface of the glass substrate. The pixel assembly layer 130c has a plurality of transparent pixel electrodes. The transparent pixel electrodes are arranged at a prescribed pitch P in a two-dimensional matrix form in a plane that is perpendicular to the optical axis of the collimate lens 120 (The plane is an xy-plane perpendicular to the plane of FIG. 3, where the x axis is perpendicular to the plane of FIG. 3 and the y axis is parallel to the plane of FIG. 3.). Note that the position of each transparent pixel electrode is defined by a corresponding coordinate (x, y) in the xy-plane.

In the LCD 130 configured above, the light-receiving layer 130a is arranged to face the collimate lens 120 and the light-transmitting layer 130b is arranged to face the relay lens 140. The pixel assembly layer 130c is connected to the controller 60. When the transparent pixel electrodes of the pixel assembly layer 130c are electrically-driven with a desired pattern in an addressing mode by a control unit 60g (described later) of the controller 60, the liquid-crystal molecules in the twist nematic liquid-crystal layer 130d change their orientation in accordance with the desired pattern.

When the writing light emerging from the collimate lens 120 impinges on the twist nematic liquid-crystal layer 130d through the polarizing plate of the light-receiving layer 130a, the polarization of the light is changed. The writing light is generated as intensity-modulated light when the writing light passes the polarizing plate of the light-transmitting layer 130b. Thus, the LCD 130 can output intensity-modulated light that has intensity distribution of a desired pattern in the cross section.

The relay lens 140 transmits the intensity-modulated light emerging from the LCD 130 to the PAL-SLM 150. The relay lens 140 has a numerical aperture $NA_L$ on the side of the LCD 130. The numerical aperture $NA_L$ has a value that satisfies the relationship of $\frac{1}{2}P < NA_L/\lambda < 1/P$, where P is the pixel pitch of the LDC 130 and $\lambda$ is the wavelength of the writing light of the writing light source 110. Then, the relay lens 140 can eliminate the signal component of spatial frequency 1/P, which results from the pixel assembly layer 130c of the LDC 130, and can transmit the intensity pattern displayed on the LCD 130 to the PAL-SLM 150 with high accuracy.

The PAL-SLM 150 is a reflection type of optically-addressed phase modulated spatial light modulator. The PAL-SLM 150 is optically addressed by the intensity-modulated light transmitted via the relay lens 140, thereby phase-modulating the reading light that has passed through the collimate lens 30. Thus, the PAL-SLM 150 generates the phase-modulated light that has phase distribution of a desired pattern in the cross section. The PAL-SLM 150 is composed of a writing-side transparent substrate 150a, a reading-side transparent substrate 150b, a transparent electrode 150c, a photoconductive layer 150d, a mirror layer 150e, a liquid-crystal layer 150f, and another transparent electrode 150g. The transparent electrode 150c is interposed between the writing-side transparent substrate 150a and reading-side transparent substrate 150b. The reading-side transparent substrate 150b defines an incidence and emission plane for the reading light. This substrate 150b is made of transparent material such as glass.

The transparent electrodes 150c and 150g are electrically connected to an AC power supply (not shown). The photoconductive layer 150d is made of amorphous silicon. The liquid-crystal layer 150f includes nematic liquid-crystals, the molecules of which are horizontally oriented. The liquid-crystal molecules rotate in a specific plane in accordance with the voltage applied to the layer 150*f*, to change the refractive index of the liquid-crystal layer 150*f*.

The PAL-SLM 150 thus configured has the writing-side transparent substrate 150*a* facing the relay lens 140, and the reading-side transparent substrate 150*b* facing the collimate lens 30 and Fourier lens 50. In addition, the PAL-SLM 150 is positioned in order that the reading light emerging from the collimate lens 30 impinges on the reading-side transparent substrate 150*b* obliquely. That is, the reading light impinges on the reading-side transparent substrate 150*b* obliquely at a predetermined incidence angle θ with respect to an optical axis I of the incidence light. After the reading light is reflected by the mirror layer 150*e*, the reading light emerges from the reading-side transparent substrate 150*b* along optical axis O of reflection inclined at reflection angle θ that is identical to the incidence angle to reach the Fourier lens 50. Note that the reading light source 10 is oriented so that the reading light, or lineally polarized light P, impinges on the PAL-SLM 150 as a p-polarized beam. In the PAL-SLM 150, the liquid-crystal molecules in the liquid-crystal layer 150*f* are oriented almost parallel to the polarization plane of the reading light. Accordingly, a predetermined plane on which the liquid crystal molecules rotate in accordance with the voltage applied to the liquid-crystal layer 150*f* is almost parallel to the normal plane of the reading light. (Note that the normal plane is the plane of FIG. 3, containing the optical axis I of incidence of the reading light, the optical axis O of reflection thereof, and the normal to the mirror layer 150*e*.)

When the intensity-modulated light emitting from the LCD 130 impinges and focuses on the photoconductive layer 150*d* through the relay lens 140, the crystal structure of the amorphous silicon of the photoconductive layer 150*d* changes, thereby changing a voltage applied across the liquid-crystal molecules. Accordingly, the photoconductive layer 150*d* exhibits Electrically Controlled Birefringence (ECB) effect in which the liquid-crystal molecules are rotated to change the index of birefringence of the liquid-crystal layer 150*f*. Hence, the reading light which has passed through the collimate lens 30 is phase-modulated when propagating in the liquid-crystal layer 150*f*. The reading light is reflected at the mirror layer 150*e*, propagates in the liquid-crystal layer 150*f* again, and exits from the PAL-SLM as the phase-modulated light. The phase-modulated light has phase distribution with a wavefront distortion, which corresponds to the intensity distribution of the intensity-modulated light emerging from the LCD 130. The phase-modulated light emitted from the PAL-SLM 150 undergoes spatial Fourier transform in the Fourier lens 50 to be focused on the process target T.

The structures of the PAL-SLM 150 and phase modulation module 40 are detailed in PCT publication WO00/34823, for example.

Figure 4:
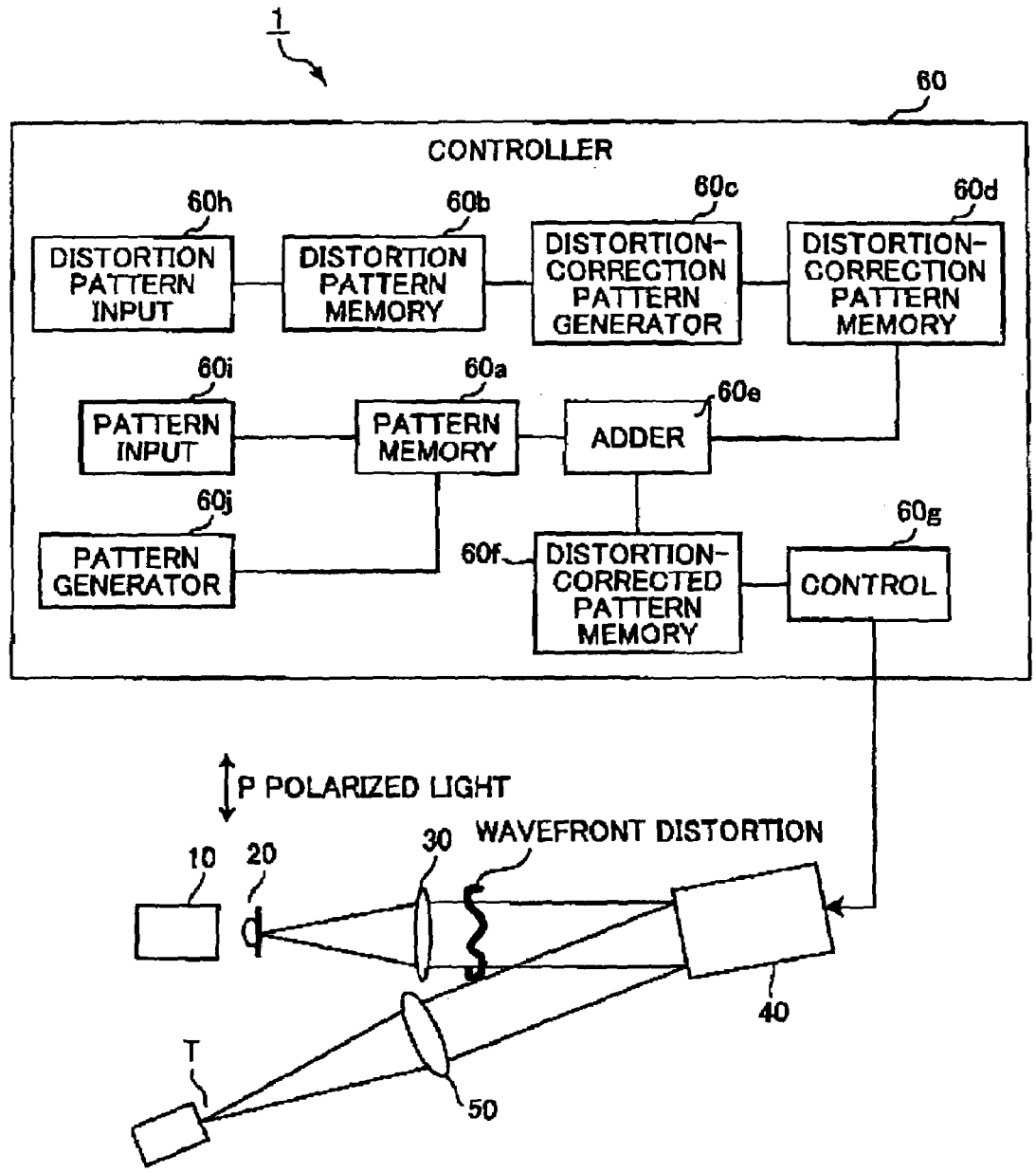
FIG. 4 is a functional block diagram illustrating the controller shown in FIG. 2.

As shown in the functional block diagram of FIG. 4, the controller 60 includes a pattern memory unit 60*a*, a distortion pattern memory unit 60*b*, a distortion-correction pattern generating unit 60*c*, a distortion-correction pattern memory unit 60*d*, an adder unit 60*e*, a distortion-corrected pattern memory unit 60*f*, a control unit 60*g*, a distortion pattern input unit 60*h*, a pattern input unit 60*i*, and a pattern generating unit 60*j*. The pattern memory unit 60*a*, the distortion pattern memory unit 60*b*, the distortion-correction pattern memory unit 60*d*, and the distortion-corrected pattern memory unit 60*f* are constituted in the hard disk drive 61.

The distortion-correction pattern generating unit 60*c* is controlled by the CPU 62 to executes the program for generating distortion correction patterns to generate distortion correction patterns. The adder unit 60*e* is controlled by the CPU 62 to execute the program for generating distortion corrected patterns, thereby adding patterns as will be explained later. The control unit 60*g* is controlled by the CPU 62 to execute the program for driving the module, thus driving the phase modulation module 40. The distortion pattern input unit 60*h* includes the input/output (I/O) interface 66. The pattern input unit 60*i* includes either one of the reading device 65 and the NCU 67. The pattern generating unit 60*j* is controlled by the CPU 62 to execute an image-generating program to generate desired phase patterns.

The pattern memory unit 60*a* stores data H (x, y) that represents a desired phase pattern by which the process target T should be processed. In the present embodiment, the desired phase pattern data represents a computer-generated hologram pattern (hereinafter referred to as "CGH pattern"). The CGH pattern data H (x, y) indicates the phase value (i.e., amount of phase modulation) by which light should be phase-modulated at each position (x, y) of a transparent pixel electrode in the pixel assembly layer 130*c* of the LCD 130 of the phase modulation module 40.

Figure 5:
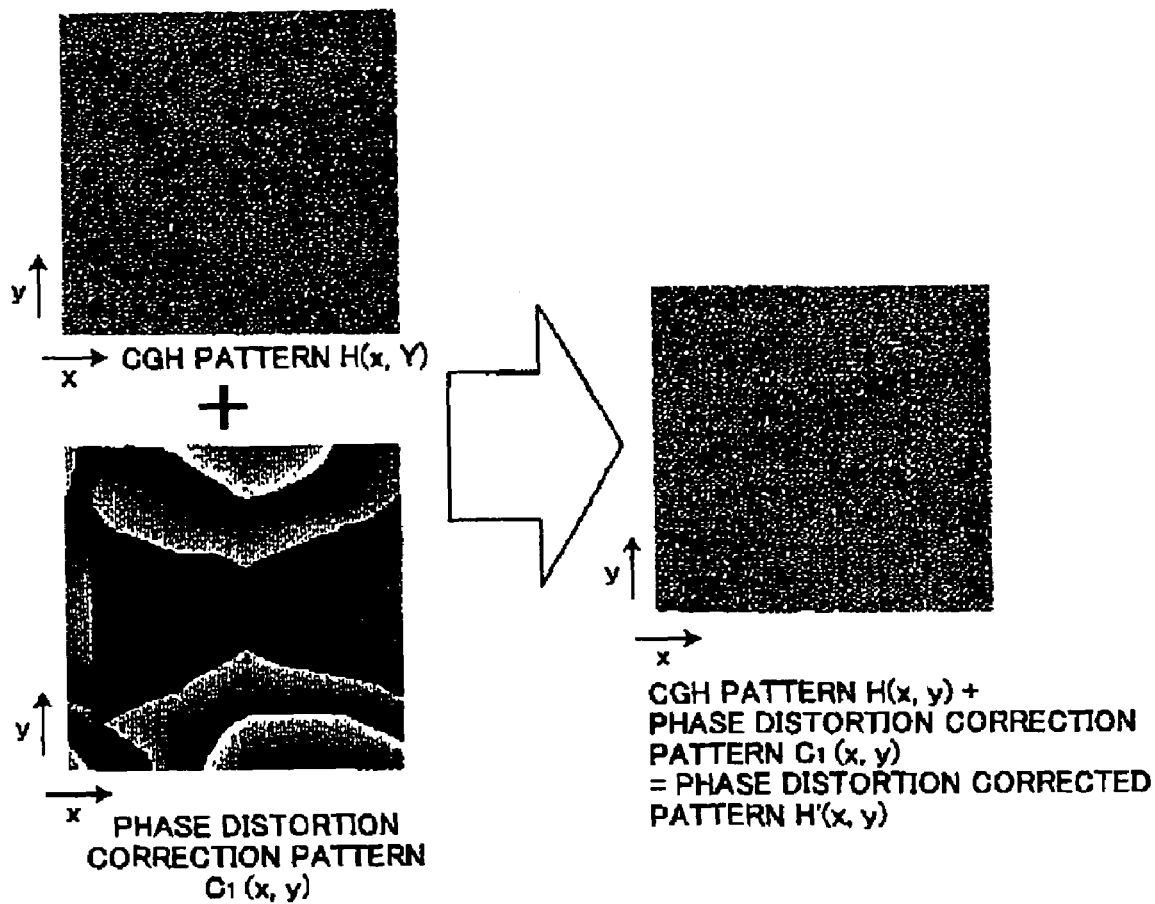
FIG. 5 is a diagram explaining that a CGH pattern H (x, y) and a phase distortion correction pattern $C_1$ (x, y) are added to generate a wavefront-distortion corrected pattern H' (x, y) in the first embodiment of the present invention.

More specifically, the CGH pattern data H (x, y) includes the phase value for every pixel (x, y) as is illustrated in FIG. 5. For example, the CGH pattern data H (x, y) value for the pixel at position (0, 0) on the upper-left corner is 2.5π, and the CGH pattern data H (x, y) value for the pixel immediately right to this pixel is 3.4π. In FIG. 5, a pixel with phase value 0 has black color, a pixel with phase value 2π has while color, and a pixel with a phase value ranging from 0 to 2π has gray color. In FIG. 5, any pixel having a phase value equal to or greater than 2π or a negative phase value is replaced by one having a phase value ranging from 0 to 2π, which is the remainder obtained by dividing the phase value by 2π.

Note that the CGH pattern data H (x, y) is data that the CPU 62 (pattern generating unit 60*j*) has generated as it executes a program for images. Alternatively, the CGH pattern data (x, y) can be entered via the pattern input unit 60*i* from outside. In this case, the. CGH pattern data (x, y) has been stored in a recording medium such as a flexible disk, a CD-ROM or a DVD or has been uploaded to the network 68. The reading device 65 or the NCU 67 (i.e., pattern input unit 60*i*) receives the CGH pattern data H (x, y) from the recording medium or the network 68 to store the data into the pattern memory unit 60*a*.

The distortion pattern memory unit 60*b* is provided to store the data that represents the phase distortion pattern $\Phi_1$ (x, y) of the reading light that has passed through the collimate lens 30. The reading light emitting from the reading light source 10 has static phase distortion at the wavefront, which is caused because of the structure of the reading light source 10. Further, static phase distortion occurs at the wavefront of the reading light due to the aberration of the spatial filter 20 and collimate lens 30 because the reading light passes through the spatial filter 20 and collimate lens 30. Thus, the reading light coming from the collimate lens 30 has wavefront distortion as a curving line shown in FIG. 4 because of the optical system including the reading light source 10, the spatial filter 20, and the collimate lens 30. The distortion pattern memory unit 60*b* stores the phase distortion pattern $\Phi_1$ (x, y) that indicates the wavefront distortion. Note that "(x, y)" represents a point in a plane that is perpendicular to the optical axis of the reading light. This point (x, y) corresponds to the position of each transparent pixel electrode provided in the pixel assembly layer 130*c* of the LCD 130. That is, the phase distortion pattern $\Phi_1$ (x, y) indicates the phase value for every position (x, y) and defines the wavefront distortion of the reading light, namely a distribution of the advanced and delayed parts of the wavefront (i.e., the curving line in FIG. 4).

The data of the phase distortion pattern $\Phi_1$ (x, y) is entered via the input/output (I/O) interface 66 (more correctly, the distortion pattern input unit 60h). In other words, the input/output (I/O) interface 66 (distortion pattern input unit 60h) receives the data about the phase distortion pattern $\phi_1$ (x, y) from the wavefront detector 210, which will be described later, to store the data into the distortion pattern memory unit 60b.

The distortion-correction pattern generating unit 60c generates data of a phase distortion correction pattern $C_1$ (x, y) for eliminating the wavefront-distortion pattern, based on the data representing the wavefront distortion pattern $\Phi_1$ (x, y) stored in the distortion pattern memory unit 60b. More precisely, the distortion-correction pattern generating unit 60c calculates the pattern $-\Phi_1$ (x, y) that is inverse to the pattern $\Phi_1$ (x, y) to set the phase distortion pattern $-\Phi_1$ (x, y) as a phase distortion correction pattern $C_1$ (x, y). Accordingly, the phase distortion correction pattern $C_1$ (x, y) indicates a phase value for every position (x, y).

Figure 6:
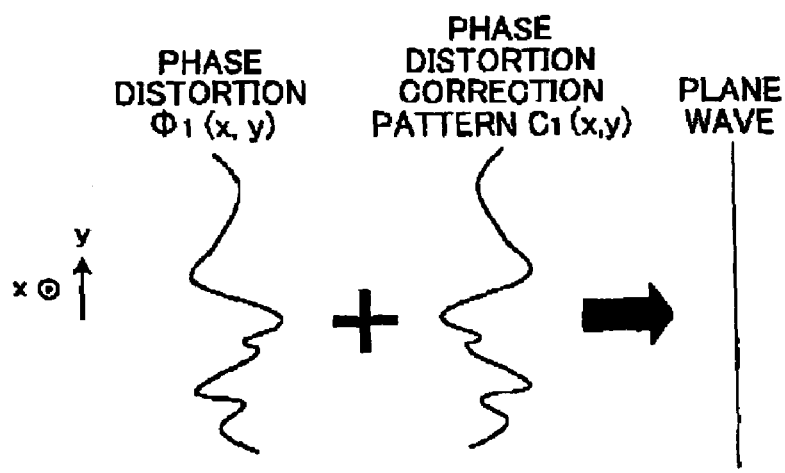
FIG. 6 is a one-dimensional diagram showing the phase distribution in the y-axis direction of a phase distortion pattern $\Phi_1$ (x, y) at given x-coordinate position, and the phase distribution in the y-axis direction of a phase distortion correction pattern $C_1$ (x, y) at a given x-coordinate position.

As described above, the phase distortion correction pattern $C_1$ (x, y) is a pattern for delaying the advanced parts of the wavefront $\Phi_1$ (x, y) and advancing the delayed parts thereof, which are illustrated as a curving line in FIG. 4. Assume that the phase distortion pattern $\Phi_1$ (x, y) has a distribution along the y-axis direction distorted at a given x-coordinate position in, as shown in FIG. 6. Then, the phase distortion correction pattern $C_1$ (x, y) is generated in order that a plane wave as illustrated in FIG. 6 may be generated by adding the phase distortion pattern $\Phi_1$ (x, y) to the phase distortion correction pattern $C_1$ (x, y). As shown in FIG. 5, the phase distortion correction pattern $C_1$ (x, y) has a value of 3.5π at a position (0, 0) on the upper-left corner, and has another value of 2.1π at the next right-hand position (1, 0).

The distortion-correction pattern memory unit 60d is designed to store the data of the phase distortion correction pattern $C_1$ (x, y) generated by the distortion-correction pattern generating unit 60c.

The adder unit 60e adds the CGH pattern data H (x, y) stored in the pattern memory unit 60a to the phase distortion correction pattern data $C_1$ (x, y) stored in the distortion-correction pattern memory unit 60d to generate data of a phase-distortion corrected pattern H' (x, y). That is, the adder unit 60e performs operation of H' (x, y)=H (x, y)+$C_1$ (x, y).

To be more specific, the adder unit 60e adds the CGH pattern data H (x, y) and the phase-distortion correction pattern data $C_1$ (x, y) for every pixel position (x, y) to generate a phase-distortion corrected pattern H' (x, y) as illustrated in FIG. 5. In the phase distortion corrected pattern H' (x, y) thus generated, the position (0, 0), or the upper-left corner, has a phase value of 6π (=2.5π+3.5π), and the position (1, 0) has a phase value of 5.5π (=3.4π+2.1π).

Since the reading light consists of continuous waves, the output of the adding unit 60e is not changed even if the wavefront is displaced by one-wave length, or 2π-phase. Thus, the adder unit 60e performs a conversion process (hereinafter referred to as "phase turn-up process") when the phase-distortion corrected pattern data H' (x, y) has a negative phase value or a phase value equal to or greater than 2π for every pixel (x, y). In the phase turn-up process, the phase value for each pixel is replaced with the remainder obtained by dividing the phase value by 2π. For example, the phase value H'(0, 0)=6π for the pixel position (0, 0) is converted to H' (0, 0)=0. The phase value H' (1, 0)=5.5π for the pixel position (1, 0) is converted to H' (1, 0)=1.5π. To find the remainder of dividing a negative phase value by 2π, the absolute value of the negative phase is first obtained, and a minimum positive value is then obtained which yields an integral multiple of 2π when added to the absolute value. For example, if the phase value H' (2, 0) for the pixel position (2, 0) is −0.3π, the phase value H' (2, 0) is converted to 1.7π. In the present embodiment, the adder unit 60e carries out the phase turn-up process. Therefore, even if the PAL-SLM 150 cannot perform phase modulation at a phase value of 2π or more, the PAL-SLM 150 can perform essentially the same phase modulation by using the remainder of dividing the phase value by 2π.

The distortion-corrected pattern memory unit 60f is used to store the distortion-corrected pattern data H' (x, y) generated by the adder unit 60e.

The control unit 60g generates a drive signal based on the distortion-corrected pattern data H' (x, y) stored in the distortion-corrected pattern memory unit 60f to drive the LCD 130 incorporated in the module 40.

The modulation process by the laser process apparatus 1 of the above-described configuration will be explained with reference to FIG. 7(A).

The adder unit 60e starts adding patterns, when a user instructs the laser process apparatus 1 to operate through the input device of the controller 60 (S1).

The pattern-adding process (S1) will be described, with reference to FIG. 7(B).

In the pattern-adding process, the CPU 62 first reads a desired CGH pattern data H (x, y) from the pattern memory unit 60a (step S2).

The CPU 62 then reads a phase distortion correction pattern data $C_1$ (x, y) from the distortion-correction pattern memory unit 60d (step S3).

Next, the CPU 62 adds the CGH pattern data H (x, y) and the phase distortion correction pattern data $C_1$ (x, y), thereby generating phase distortion corrected pattern data H' (x, y) (=H (x, y)+$C_1$ (x, y)) (step S4). If the value of the phase distortion corrected pattern data H' (x, y) for every pixel (x, y) has a negative value or a value equal to or greater than 290 , the adder unit 60e performs the phase turn-up process, in which the value is replaced with the remainder obtained by dividing the phase value by 2π.

As described above, phase distortion corrected pattern data H' (x, y) is obtained. This data is stored into the distortion-corrected pattern memory unit 60f (step S5).

Thus, the pattern-adding process (S1) is completed.

Thereafter, the CPU 62 carries out a driving process to drive the phase modulation module 40 in step S7. More specifically, the CPU 62 generates a drive signal based on the phase distortion corrected pattern data H' (x, y) to drive every transparent pixel electrode at a pixel position (x, y) in the pixel assembly layer 130c of the LCD 130. At the same time, the writing light source 110 and the reading light source 10 are turned on. The LCD 130 generates intensity-modulated light having the intensity distribution of the phase distortion corrected pattern H' (x, y). The intensity-modulated light is transmitted through the relay lens 140 to the photoconductive layer 150d of the PAL-SLM 150. The PAL-SLM 150 is optically addressed by the intensity-modulated light that has the intensity distribution of the phase distortion corrected pattern H' (x, y) in cross section. The reading light having the wavefront distortion of the phase distortion pattern $\Phi_1$ (x, y) in cross section passes through the collimate lens 30 to the PAL-SLM 150. The PAL-SLM 150 phase-modulates the reading light with the phase distortion corrected pattern H' (x, y) to generate phase-modulated light that has the original wavefront of the CGH pattern H (x, y).

That is to say, the PAL-SLM 150 phase-modulates the reading light having the wavefront distortion of the phase distortion pattern $\Phi_1$ (x, y) with the phase distortion corrected pattern H' (x, y) to carry out addition of phase distributions, which is expressed by the following equation (1):

$$\Phi_1(x, y) + H'(x, y) = \Phi_1(x, y) + \{C_1(x, y) + H(x, y)\} \quad (1)$$
$$= \Phi_1(x, y) + \{-\Phi_1(x, y) + H(x, y)\}$$
$$= H(x, y)$$

Thus, the PAL-SLM 150 generates the reading light that has the phase distribution of a desired CGH pattern H (x, y). This reading light passes through the Fourier lens 50 to form a desired pattern corresponding to the CGH pattern H (x, y) on the process target H.

Note that the program for generating the distortion corrected patterns is constituted by a program that performs the pattern-adding process (S1). It should also be noted that the program for driving the module is constituted by a program that performs step S7.

As described above, in the present embodiment, the phase distortion correction pattern $C_1$ (x, y) is stored beforehand in the distortion-correction pattern memory unit 60d. Accordingly, it is possible to obtain the phase distortion corrected pattern H' (x, y) just by reading the pattern $C_1$ (x, y) from the memory unit 60d and adding the pattern $C_1$ (x, y) to the desired phase pattern H (x, y). Therefore, the phase distortion corrected pattern H' (x, y) can be acquired within a short time. It is therefore possible to perform a real-time control for the phase distortion corrected pattern H' (x, y).

Even if the reading light source 10, the spatial filter 20, and the collimate lens 30 are not high precision optical members, the phase modulation module 40 can efficiently generates light phase-modulated with the desired phase pattern H (x, y) when the phase modulation module 40 is driven by the phase distortion corrected pattern H' (x, y). Accordingly, expensive optical members are not required. In addition, the structure of the laser process apparatus 1 can be made simple, so that the laser process apparatus 1 is manufactured at lower cost.

In this embodiment, the laser process apparatus 1 performs a distortion-correction pattern forming process before starting processing the process target. Namely, the wavefront distortion of the reading light emerging from the collimate lens 30 is measured, so that phase distortion pattern data $\Phi_1$ (x, y) is generated. And then phase distortion correction pattern data $C_1$ (x, y)=$-\Phi_1$ (x, y) is generated to be stored in the distortion-correction pattern memory unit 60d.

The distortion-correction pattern forming process will be explained, with reference to FIG. 8 to FIG. 9(B).

Figure 8:
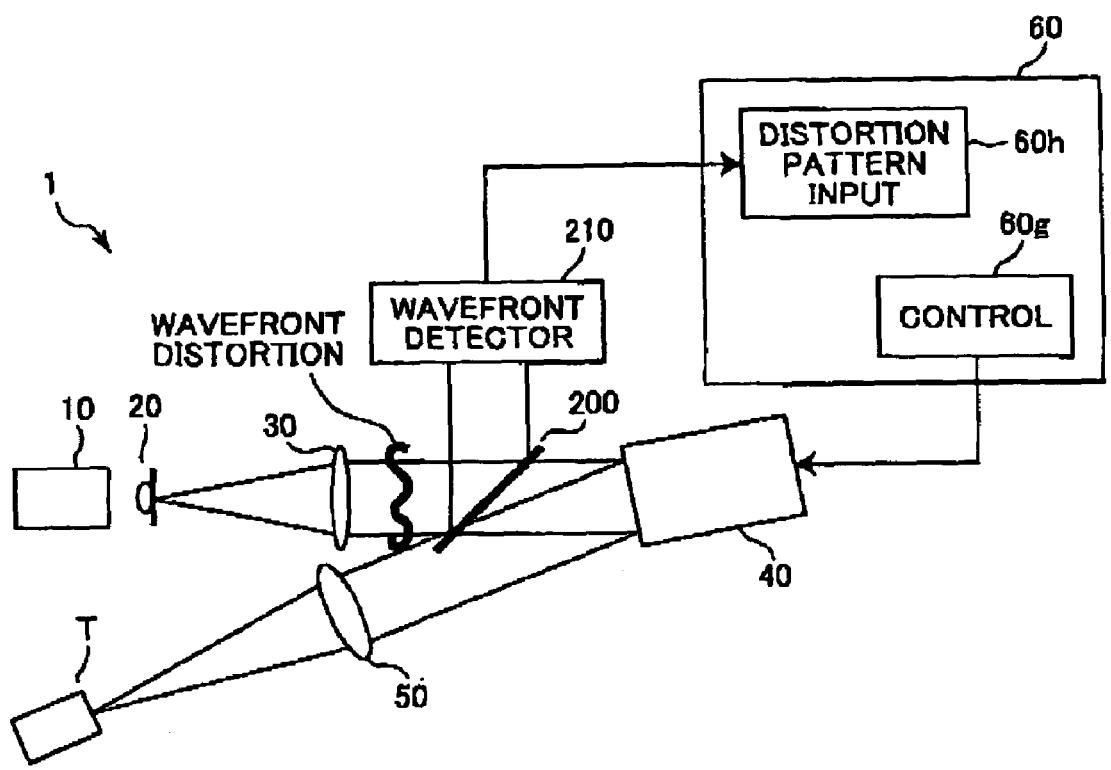
FIG. 8 is a block diagram explaining that a beam sampler and a wavefront detector are arranged in a laser process apparatus in order to generate a distortion correction pattern in the first embodiment of the present invention.

To generate the distortion-correction pattern, a user arranges a beam sampler 200 and a wavefront detector 210 in the laser process apparatus 1, as illustrated in FIG. 8. In FIG. 8, only the distortion pattern input unit 60h and the control unit 60g are shown to facilitate understanding, and other members 60a to 60f, 60i and 60j of the controller 60 are not illustrated.

The beam sampler 200 is configured to reflect a part of the incident light, and allow the rest of the incident light to pass therethrough. In the present embodiment, the beam sampler 200 is located downstream of the collimate lens 30. The beam sampler 200 reflects a part of the reading light that has passed through the collimate lens 30, and allows the remaining part of the reading light to pass therethrough to the phase modulation module 40.

The wavefront detector 210 measures a wavefront of the incident light thereon. For example, the detector 210 consists of a well-known Shack-Hartmann sensor. The Shack-Hartmann sensor is composed of a lens array, a two-dimensional detector, and a signal-processing unit, which are not shown. The lens array collects light. The two-dimensional detector converts a light spot focused on the lens array into an image signal. The signal-processing unit processes the image signal to generate data that represents a wavefront pattern of the light. The wavefront detector 210 configured above is located at a position to receive the light reflected by the beam sampler 200. The detector 210 detects the wavefront of the incident light to generate the phase distortion pattern data representing the distortion of the wavefront. A signal-processing unit of the wavefront detector 210 is connected to the input/output (I/O) interface 66 (the distortion pattern input unit 60h) of the controller 60, so that the phase distortion pattern data generated by the detector 210 can be entered to the controller 60. The wavefront detector 210 may be constituted by an interferometer.

Figure 9A:
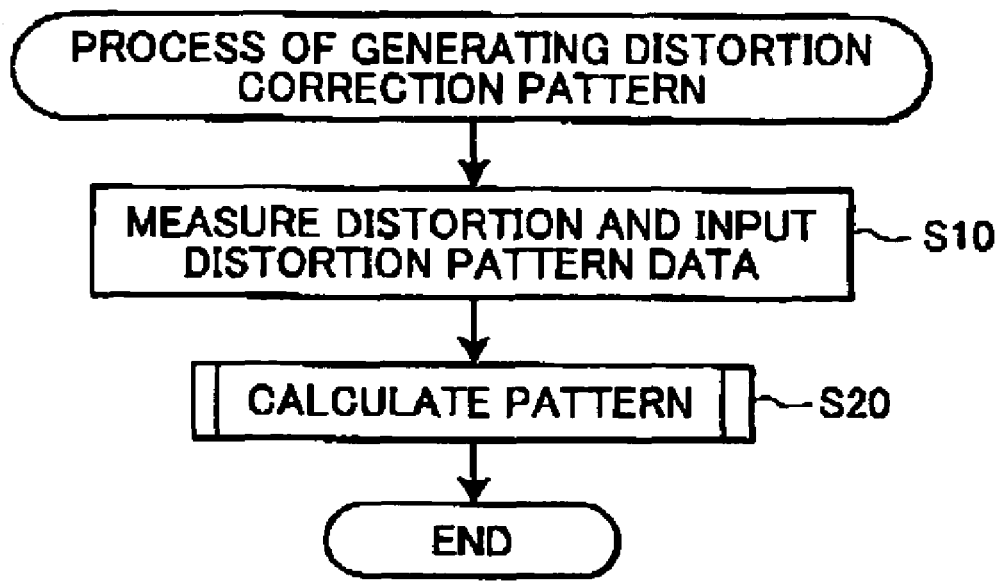
FIG. 9(A) is a flowchart explaining a process to generate a distortion correction pattern in the first embodiment of the present invention.

After the user installs the wavefront detector 210 in the laser process apparatus 1, a measuring process is started as shown in FIG. 9(A) (step S10). That is, the user starts driving the reading light source 10. The beam sampler 200 reflects a part of the reading light emerging from the collimate lens 30 to guide the reflected light to the wavefront detector 210. The wavefront detector 210 measures the wavefront of the incident reading light to generate the phase distortion pattern data $\Phi_1$ (x, y) that indicates the wavefront distortion of the light. The phase distortion pattern data $\Phi_1$ (x, y) is then stored via the distortion pattern input unit 60h into the distortion pattern memory unit 60b. When the wavefront detector 210 finishes measuring the wavefront of the reading light, the reading light source 10 is turned off.

Next, the controller 60 starts a pattern-calculating process (step S20).

The pattern-calculating process will be explained with reference to FIG. 9(B).

In the pattern-calculating process, the distortion-correction pattern generating unit 60c reads the phase distortion pattern data $\Phi_1$ (x, y) from the distortion pattern memory unit 60b. The unit 60c then inverts the sign of the phase distortion pattern data $\Phi_1$ (x, y), thereby generating phase distortion correction pattern data $C_1$ (x, y) (step S26). That is to say, the distortion-correction pattern generating unit 60c performs the operation of $C_1$ (x, Y)=$-\Phi_1$ (x, y) to obtain a phase distortion correction pattern $C_1$ (x, y).

The phase-distortion correction pattern data $C_1$ (x, y) is stored in the distortion-correction pattern memory unit 60d (step S28). Thus, the pattern-calculating process (step S20 shown in FIG. 9(A)) is finished, and a distortion-correction pattern generating process is also over. The user removes the beam sampler 200 and wavefront detector 210 from the laser process apparatus 1 to return the system to the state shown in FIG. 1.

As described above, in this embodiment, the laser process apparatus 1 first measures a phase distortion pattern data $\Phi_1$ (x, y) and then generates a phase distortion correction pattern $C_1$ (x, y), thereby storing the resultant pattern $C_1$ (x, y) into the distortion-correction pattern memory unit 60d.

Figure 9B:
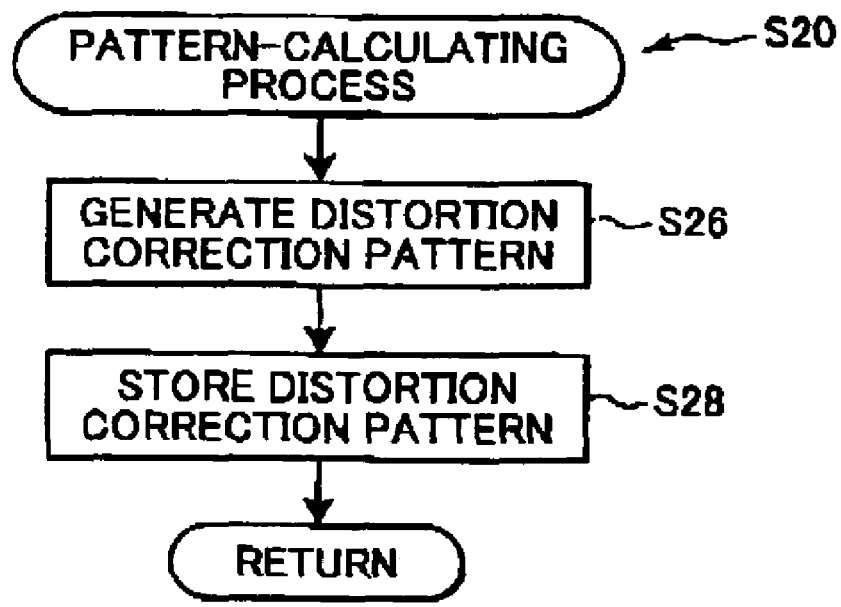
FIG. 9(B) is a flowchart explaining the step of calculating a distortion-corrected pattern in the distortion-pattern generating process of FIG. 9(A)

It should be noted that the program for generating a distortion-correction pattern includes a program for executing the pattern-calculating process S20 (i.e., step S20 shown in FIG. 9(B)).

(First Modification)

Hereinafter, a first modification of the present embodiment will be described.

As described above, the laser process apparatus 1 has the structure illustrated in FIG. 1. The beam sampler 200 and the wavefront detector 210 are incorporated in the laser process apparatus 1 as shown in FIG. 8, only when the distortion-correction pattern forming process (FIG. 9(A), FIG. 9(B)) is executed. Alternatively, the laser process apparatus 1 may have the structure of FIG. 8. That is, the beam sampler 200 and the wavefront detector 210 may be installed in the apparatus 1 as is illustrated in FIG. 8. In this case, the laser process apparatus 1 having the structure shown in FIG. 8 performs the distortion-correction pattern forming process (FIG. 9(A), FIG. 9(B)) and then performs the phase modulation (FIG. 7(A), FIG. 7(B)). The beam sampler 200 passes through and guides most part of the reading light to the phase modulation module 40, so that the phase modulation module 40 can exert the phase modulation on most of the reading light emerging from the reading light source 10. Therefore, the processing of the target is not hindered by the beam sampler 200 in the optical path of the reading light.

(Second Modification)

As shown by the curving dashed line of FIG. 1, the wavefront of the reading light may have static phase distortion due to the low surface-precision of the reading-side transparent substrate 150b provided in the PAL-SLM 150. More precisely, the reading light is distorted when passing through the reading-side transparent substrate 150b of the PAL-SLM 150. In view of this, the static wavefront distortion due to the reading light source 10, the spatial filter 20, the collimate lens 30, and the PAL-SLM 150 may be measured in advance and eliminated.

In the present modification, in the process of generating a wavefront-distortion correction pattern (FIG. 9(A)), the beam sampler 200 is placed downstream of the phase modulation module 40 to reflect a part of the reading light emerging from the PAL-SLM 150 to the wavefront detector 210, as illustrated in FIG. 10. In this condition, the measuring process (S10) shown in FIG. 9(A) is carried out. In FIG. 10, only the distortion pattern input unit 60h and the control unit 60g are shown as in FIG. 8. And the other members 60a to 60f, 60i and 60j of the controller 60 are not illustrated.

While the wavefront detector 210 detects the wavefront distortion in S10, the control unit 60g keeps the phase modulation module 40 off. Namely, the control unit 60g does not supply a drive signal to the LCD 130, turns off the writing light source 110, and does not apply a voltage from the AC power supply (not shown) to the PAL-SLM 150. This conditions inhibit the liquid-crystal layer 150f of the PAL-SLM 150 from phase-modulating the reading light. The wavefront detector 210 can therefore detect wavefront distortion induced due to the reading light source 10, the spatial filter 20, the collimate lens 30, and the reading-side transparent substrate 150b of PAL-SLM 150 (hereinafter referred to as "$\Phi_2$ (x, y)"). The wavefront detector 210 stores the detected phase distortion pattern $\Phi_2$ (x, y) in the distortion pattern memory unit 60b through the distortion pattern input unit 60h.

It is not preferable to drive the phase modulation module 40 during the measuring process S10 (FIG. 9(A)). Suppose that the phase modulation module 40 is turned on. That is, if a drive signal was supplied to the LCD 130, thus turning on the writing light source 110, and an AC voltage was applied to the PAL-SLM 150, the LCD 130 would generate intensity-modulated light that represents a kind of pattern, so that the PAL-SLM 150 processes the wavefront of the reading light in accordance with the intensity-modulated light to generate the phase pattern corresponding to the intensity-modulated light (wavefront distortion). In this case, the wavefront detector 210 detects the wavefront distortion due to the optical members 10 to 30 and 150 and the wavefront distortion due to the pattern appearing on the LCD 130 together which are superimposed to each other. In other words, the detector 210 cannot detect only the wavefront distortion due to the members 10 to 30 and 150, independently of the wavefront distortion due to the pattern.

In the pattern-calculating process of FIG. 9(B), the distortion-correction pattern generating unit 60c reads the phase distortion pattern data $\Phi_2$ (x, y) from the distortion pattern memory unit 60b in step S26 to calculate an inverse pattern $C_2$ (x, y) of the pattern data $\Phi_2$ (x, y) (=−$\Phi_2$ (x, y)). In step S28, the inverse pattern $C_2$ (x, y) is stored in the distortion-correction pattern memory unit 60d as a phase-distortion correction pattern. Thus, after the pattern-calculating process (S20) is finished, the beam sampler 200 and wavefront detector 210 are removed from the laser process apparatus 1. The laser process apparatus 1 then returns to the state shown in FIG. 1.

Figure 7A:
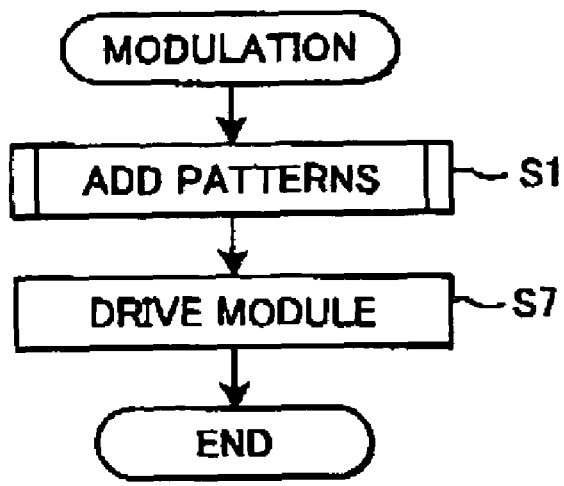
FIG. 7(A) is a flowchart explaining the modulation performed in the first embodiment of the present invention.
Figure 7B:
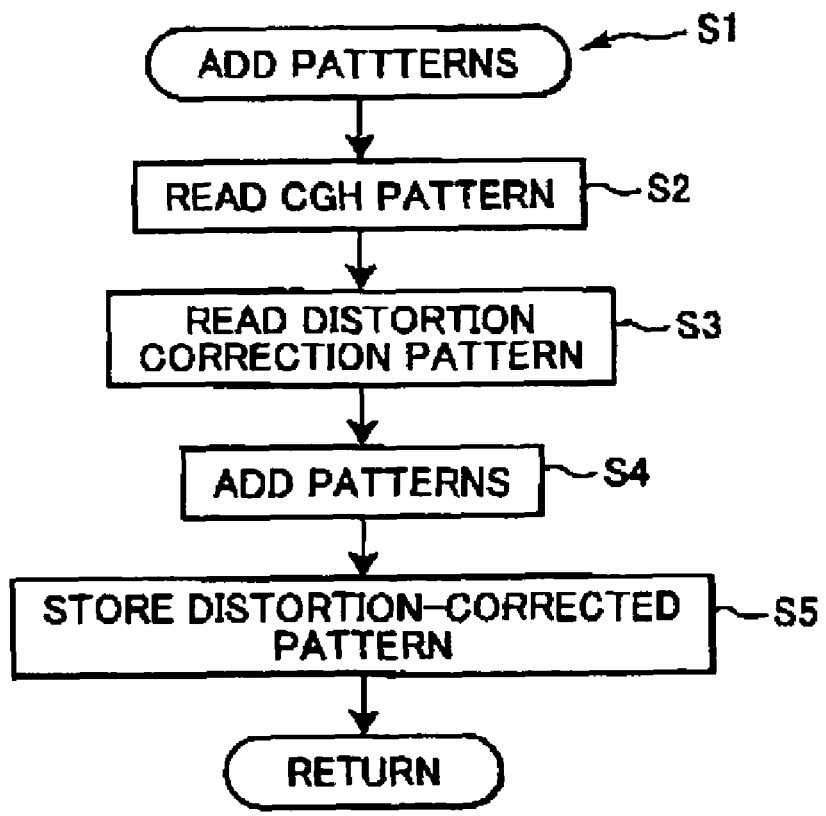
FIG. 7(B) is a flowchart explaining the pattern-adding process carried out during the modulation of FIG. 7(A)

In the phase modulation (FIG. 7(A), FIG. 7(B)), the adder unit 60e adds the phase-distortion correction pattern $C_2$ (x, y) and a desired CGH pattern H (x, y) to generate a phase distortion corrected pattern H' (x, y) (S1). A drive signal for the LCD 130 is generated based on the resultant phase distortion corrected pattern H' (x, y) to drive the phase modulation module 40 (S7).

In this modification, the wavefront detector 210 detects the phase distortion pattern $\Phi_2$ (x, y) due to the reading light source 10, the spatial filter 20, the collimate lens 30, and the reading-side substrate 150b of PAL-SLM 150. For eliminating the pattern $\Phi_2$ (x, y), a phase distortion correction pattern $C_2$ (x, y) is generated to add to a desired CGH pattern H (x, y), thereby obtaining a phase distortion corrected pattern H'. The phase modulation module 40 is driven with the phase distortion corrected pattern H' (x, y), so that phase-modulated light that has the phase distribution of the desired CGH pattern H (x, y) in cross section can be generated without any distortion. As the phase-modulated light passes through the Fourier lens 50, a desired pattern corresponding to the CGH pattern H (x, y) is reliably formed on the process target T.

As described above, in the present modification, the LCD 130 is controlled with the phase distortion corrected pattern H' (x, y), even if the reading-side transparent substrate 150b of PAL-SLM 150 has distortion. Therefore, it is possible to generate light that is phase-modulated with a desired pattern H (x, y) at high precision. Accordingly, the laser process apparatus 1 can be manufactured at lower cost.

In this modification, the beam sampler 200 and wavefront detector 210 may be installed in the apparatus 1 as is shown in FIG. 10, similarly to the first modification. In this case, after the laser process apparatus 1 performs the process of generating a distortion-correction pattern (FIG. 9(A), FIG. 9(B)) by means of the configuration of FIG. 10, the modulation process (FIG. 7(A), FIG. 7(B)) is performed. In the modulation, the beam sampler 200 passes through and guides most of the incident reading light to the Fourier lens 50. The Fourier lens 50 performs Fourier transform on the phase-modulated light, so that the light is used to process the target.

(Third Modification)

Figure 11:
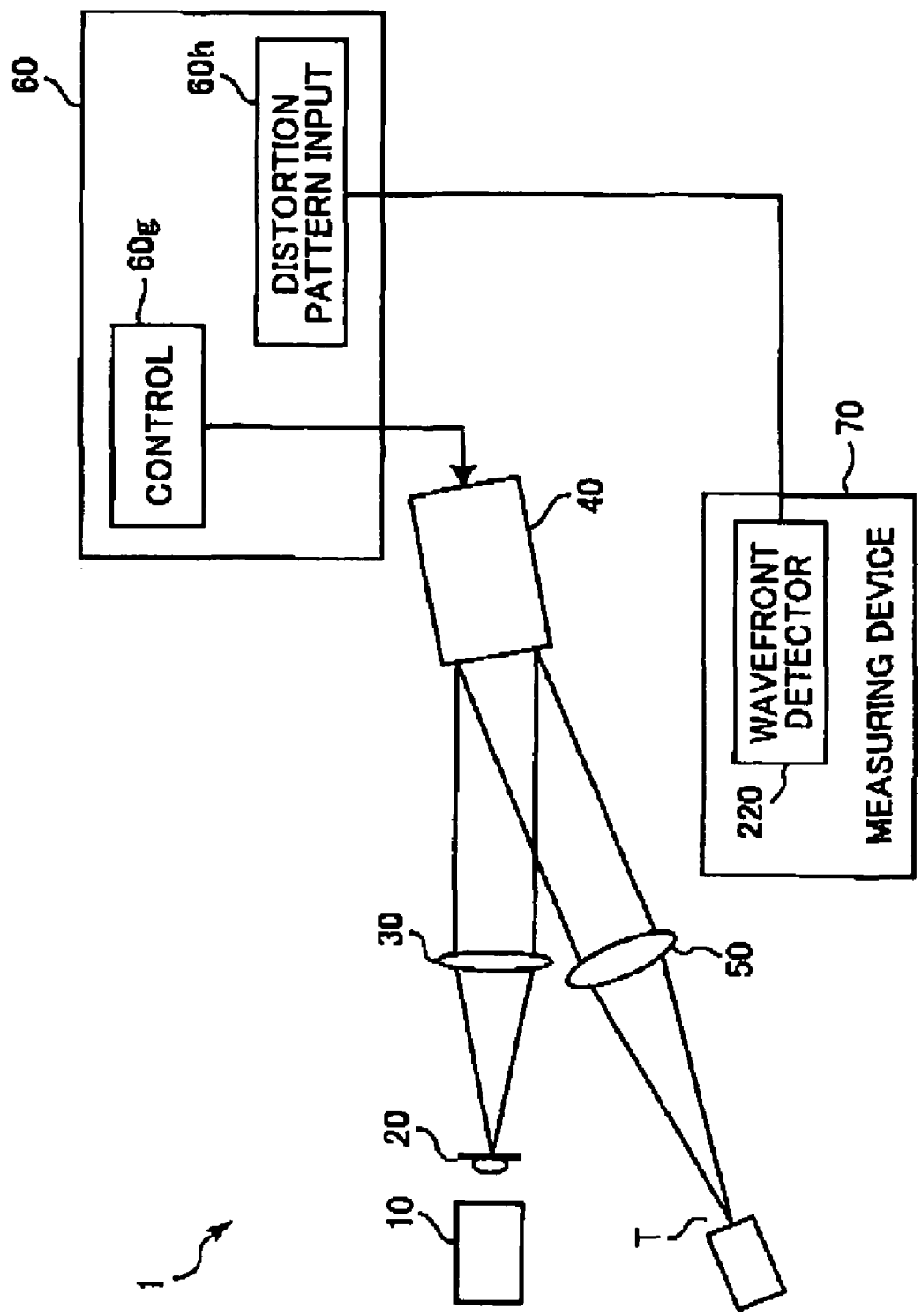
FIG. 11 is a block diagram explaining that a measuring device is connected to a laser process apparatus to generate a distortion correction pattern in the third to fifth modifications of the first embodiment of the present invention.

Only the wavefront distortion resulting from the reading-side transparent substrate 150b of PAL-SLM 150 may be measured before the phase modulation module 40 is disposed in the laser process apparatus 1. In other words, measuring equipment 70 having a wavefront detector 220 is provided to be connected to the distortion pattern input unit 60h (input/output (I/O) interface 66) of the controller 60. The wavefront detector 220 has the same structure as that of the wavefront detector 210 and operates in the same way as the wavefront detector 210. In FIG. 11, only the distortion pattern input unit 60h and the control unit 60g are shown similarly to FIGS. 8 and 10, and other members 60a to 60f, 60i and 60j of the controller 60 are not illustrated.

In this case, the process of generating a distortion-correction pattern (FIG. 9(A), FIG. 9(B)) is carried out as will be described below.

First, a user inserts the phase modulation module 40 as sample into the measuring equipment 70. The measuring process (S10) is started. That is, the phase modulation module 40 is turned off, and the reading light emerging from a predetermined reading light source and having corrected wavefront distortion is irradiated to the reading-side transparent substrate 150b of PAL-SLM 150. The wavefront detector 220 measures the wavefront distortion of the reading light emitted from the reading-side transparent substrate 150b. Assume that the phase distortion pattern of the reading-side transparent substrate 150b of PAL-SLM 150 is determined to be a phase distortion pattern $\Phi_{150}$ (x, y). Then, the wavefront detector 220 transfers the pattern data $\Phi_{150}$ (x, y) to the distortion pattern memory unit 60b through the distortion pattern input unit 60h.

Instead of setting the whole of the phase modulation module 40 in the measuring equipment 70, only the PAL-SLM 150 may be arranged in the measuring equipment 70 before being mounted into the phase modulation module 40. In this case, the PAL-SLM 150 is maintained off. More correctly, no AC voltage is applied to the PAL-SLM 150. No writing light irradiates the PAL-SLM 150. Reading light emerging from the reading light source and having corrected wavefront distortion irradiates the reading-side transparent substrate 150b of PAL-SLM 150. At this time, the wavefront detector 220 measures the wavefront distortion $\Phi_{150}$ (x, y) of the reading light emitted from the reading-side transparent substrate 150b.

Next, the pattern-calculating process (S20) is carried out. As shown in FIG. 9(B), the distortion-correction pattern generating unit 60c reads the data $\Phi_{150}$ (x, y) from the distortion pattern memory unit 60b in step S26. The unit 60c then calculates a phase distortion correction pattern $C_{150}$ (x, y) for correcting the phase distortion pattern $\Phi_{150}$ (x, y) by using the following equation:

$$C_{150}(x, y) = -1 \cdot \Phi_{150}(x, y) \quad (2)$$

The resultant phase-distortion correction pattern $C_{150}$ (x, y) is stored into the distortion-correction pattern memory unit 60d (S28).

In the modulation process (FIG. 7(A), FIG. 7(B)), the adder unit 60e reads the phase-distortion correction pattern $C_{150}$ (x, y) from the distortion-correction pattern memory unit 60d (S3). The unit 60e adds this phase-distortion correction pattern $C_{150}$ (x, y) to a desired CGH pattern H (x, y), thus generating a phase distortion corrected pattern H' (x, y) (S4). In other words, the adder unit 60e performs the operation of H' (x, y)=H (x, y)+$C_{150}$ (x, y), thereby generating the phase distortion corrected pattern H' (x, y).

(Fourth Modification)

The measuring equipment 70 may be used to measure the wavefront distortion resulting from the reading light source 10, the spatial filter 20, the collimate lens 30, and the reading-side transparent substrate 150b of PAL-SLM 150 in advance, respectively. More specifically, the measuring equipment 70 is connected to the controller 60 as shown in FIG. 11, in the distortion-correction pattern forming process (FIG. 9(A), FIG. 9(B)). In the measuring process (S10), the reading light source 10, the spatial filter 20, the collimate lens 30, the phase modulation module 40, and the PAL-SLM 150 are placed in turn in the measuring equipment 70, so that the wavefront distortion due to each member is measured. With respect to the reading light source 10, the wavefront detector 220 detects the wavefront distortion due to the reading light source 10. The wavefront detector 220 detects the wavefront distortion of the reading light emitted from the spatial filter 20. The wavefront distortion due to the collimate lens 30 is measured in the same way as that of the spatial filter 20. As for the phase modulation module 40 and the PAL-SLM 150, the wavefront distortion is measured in the same manner as those in the third modification.

Assume that phase distortion patterns $\Phi_{10}$ (x, y), $\Phi_{20}$ (x, y), $\Phi_{30}$ (x, y), and $\Phi_{150}$ (x, y) have been measured for the reading light source 10, the spatial filter 20, the collimate lens 30, and the PAL-SLM 150, respectively. Then, these phase distortion pattern data $\Phi_{10}$ (x, y), $\Phi_{20}$ (x, y), $\Phi_{30}$ (x, y) and $\Phi_{150}$ (x, y) is sent to the distortion pattern memory unit 60b through the distortion pattern input unit 60h (S10).

In the pattern-calculating process S20 (FIG. 9(B)), the distortion-correction pattern generating unit 60c reads the data $\Phi_{10}$ (x, y), $\Phi_{20}$ (x, y), $\Phi_{30}$ (x, y), and $\Phi_{150}$ (x, y) from the distortion pattern memory unit 60b. The unit 60c then generates phase distortion correction patterns $C_{10}$ (x, y), $C_{20}$ (x, y), $C_{30}$ (x, y), and $C_{150}$ (x, y) for correcting the phase distortion patterns in accordance with the following equations (2);

$$C_{10}(x, y) = -\Phi_{10}(x, y)$$

$$C_{20}(x, y) = -\Phi_{20}(x, y)$$

$$C_{30}(x, y) = -\Phi_{30}(x, y)$$

$$C_{150}(x, y) = -\Phi_{150}(x, y) \quad (2)$$

The resultant phase distortion correction patterns $C_{10}$ (x, y), $C_{20}$ (x, y), $C_{30}$ (x, y), and $C_{150}$ (x, y) are stored into the distortion-correction pattern memory unit 60d (S28).

In the modulation process (FIG. 7(A), FIG. 7(B)), the adder unit 60e reads all the phase distortion correction pattern data $C_{10}$ (x, y), $C_{20}$ (x, y), $C_{30}$ (x, y), and $C_{150}$ (x, y) from the distortion-correction pattern memory unit 60d (S3). The unit 60e adds all the phase distortion correction pattern data $C_{10}$ (x, y), $C_{20}$ (x, y), $C_{30}$ (x, y), and $C_{150}$ (x, y) to a desired CGH pattern H (x, y), thus generating a phase distortion corrected pattern H' (x, y) (S4). In other words, the adder unit 60e performs the operation of H' (x, y)=H (x, y)+$C_{10}$ (x, y)+$C_{20}$ (x, y)+$C_{30}$ (x, y)+$C_{150}$ (x, y), thereby generating a phase distortion corrected pattern H' (x, y).

(Fifth Modification)

In this modification, the measuring equipment 70 is arranged as shown in FIG. 11 in order to generate a phase distortion correction pattern $C_{150}$ (x, y) (=-$\Phi_{150}$ (x, y)) for correcting the wavefront distortion $\Phi_{150}$ (x, y) that has resulted from the reading-side transparent substrate 150b of PAL-SLM 150. The phase modulation module 40 or the PAL-SLM 150 is placed in the measuring equipment 70, so that the distortion correction pattern generating process of FIG. 9(A) and FIG. 9(B)) is carried out to generate the phase distortion correction pattern $C_{150}$ (x, y). To generate a phase distortion correction pattern $C_1$ (x, y) (=−$\Phi_1$ (x, y)) for correcting the wavefront distortion $\Phi_1$ (x, y) that has resulted from the reading light source 10, the spatial filter 20, and the collimate lens 30, the wavefront detector 210 is first placed as shown in FIG. 8. Then, the distortion correction pattern generating process of FIGS. 9(A) and 9(B) is performed, thereby generating the phase distortion correction pattern $C_1$ (x, y). As a result, the phase distortion correction pattern $C_{150}$ (x, y) is stored as the first phase distortion correction pattern into the distortion-correction pattern memory unit 60d. The phase distortion correction pattern $C_1$ (x, y) is stored as the second phase distortion correction pattern into the distortion-correction pattern memory unit 60d.

In the modulation process (FIG. 7(A), FIG. 7(B)), the adder unit 60e reads the first phase distortion correction pattern $C_1$ (x, y) and the second phase distortion correction pattern $C_{150}$ (x, y) from the distortion-correction pattern memory unit 60d (S3) to add the first and second phase distortion correction patterns $C_1$(x, y) and $C_{150}$ (x, y) to a desired CGH pattern H (x, y), thereby generating a phase distortion corrected pattern H' (x, y) (S4). In other words, the adder unit 60e performs the operation of H' (x, y)=$C_1$ (x, y)+$C_{150}$ (x, y)+H (x, y), thereby generating a phase distortion corrected pattern H' (x, y).

In the present modification, the beam sampler 200 and the wavefront detector 210 may be removable from the laser process apparatus 1. Alternatively, the beam sampler 200 and the wavefront detector 210 may be installed in the apparatus 1 as in the first modification.

(Second Embodiment)

A laser process apparatus 1 and a laser process method according to the second embodiment of the invention will be described with reference to FIG. 12.

Figure 12:
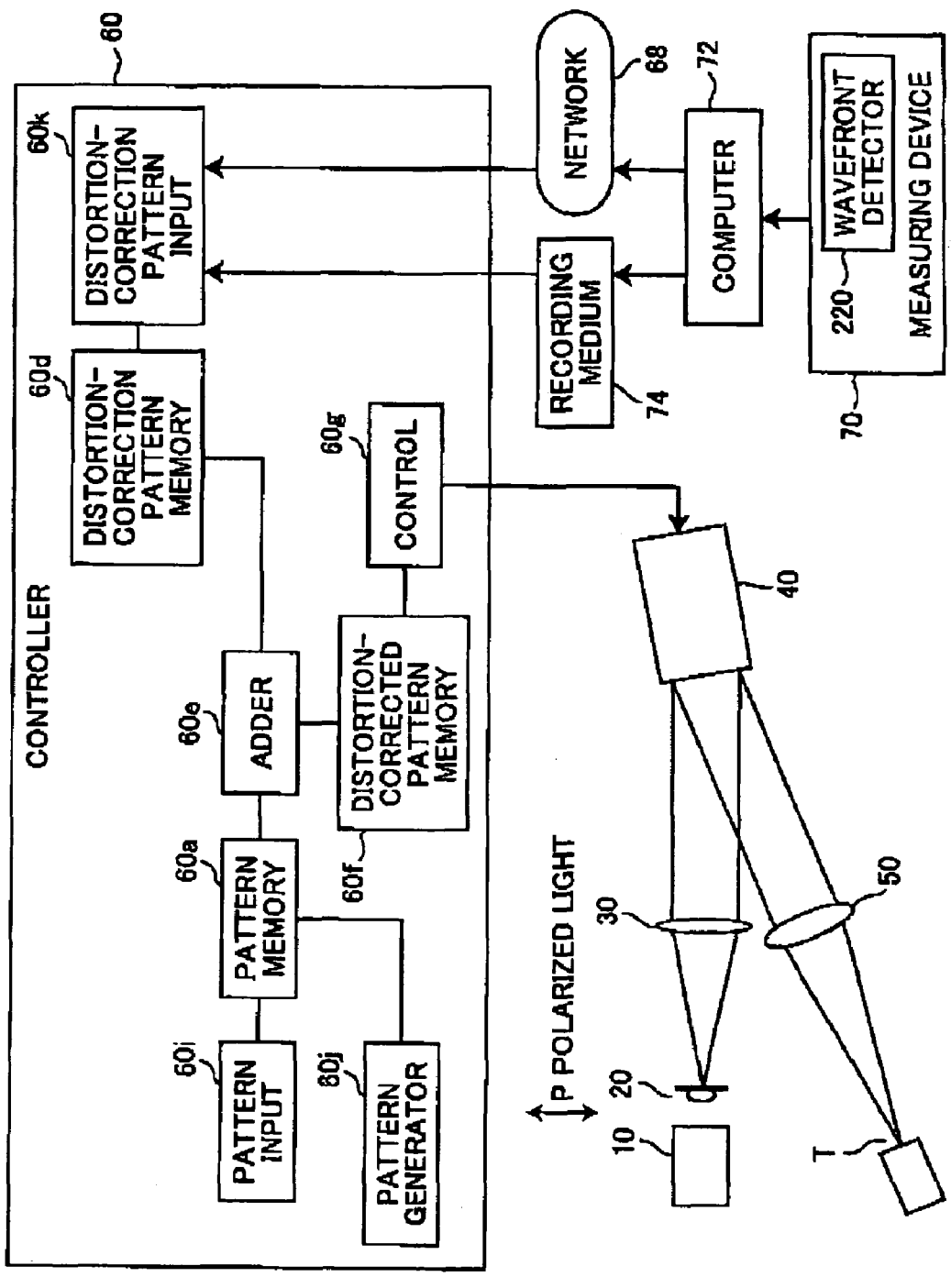
FIG. 12 is a block diagram illustrating the configuration and function of a laser process apparatus according to a second embodiment of the invention.

In this embodiment, as shown in FIG. 12, the controller 60 further includes a distortion-correction pattern input unit 60k. The distortion-correction pattern input unit 60k is constituted by either a recording-medium reading device 65 or an NCU 67. The unit 60k receives the distortion correction pattern C (x, y) from the network 68 or a recording medium 74 such as a flexible disk, a CD-ROM or a DVD to store the distortion correction pattern in the distortion-correction pattern memory unit 60d. In the present embodiment, the controller 60 does not have the distortion pattern input unit 60h, the distortion pattern memory unit 60b and the distortion-correction pattern generating unit 60c. The controller 60 does not perform the distortion-correction pattern generating process (FIG. 9(A), FIG. 9(B)) which is carried out in the first embodiment. Instead, a manufacturer of the laser process apparatus 1 performs the distortion-correction pattern process (FIG. 9(A), FIG. 9(B)) before operating the laser process apparatus 1. In this case, the manufacturer prepares a computer 72 which is provided separately from the controller 60. The manufacturer prepares measuring equipment 70 to Connect the wavefront detector 220 in the measuring equipment 70 to the computer 72.

More precisely, in the preset embodiment, the manufacturer of the laser process apparatus 1 generates the distortion correction pattern $C_1$ (x, y) for correcting the wavefront distortion $\Phi_1$ (x, y) due to the reading light source 10, the spatial filter 20, and the collimate lens 30, before arranging these optical components 10, 20 and 30 to manufacture the laser process apparatus 1. That is, the manufacturer first arranges the reading light source 10, the spatial filter 20, and the collimate lens 30 in the same positional relation as those in the laser process apparatus 1, as illustrated in FIG. 1, and then inserts these components as samples into the measuring equipment 70. Using the computer 72, the manufacturer carries out the process of generating a distortion-correction pattern (FIG. 9(A), FIG. 9(B)).

TO be more specific, the measuring process (S10) shown in FIG. 9(A) is first carried out. The reading light source 10 is turned on, and the wavefront detector 220 measures the phase distortion pattern $\Phi_1$ (x, y) of the light emitted from the collimate lens 30. The measured pattern $\Phi_1$ (x, y) is stored in the computer 72. The computer 72 performs the pattern-calculating process (S20) shown in FIG. 9(B) to calculate a phase distortion correction pattern $C_1$ (x, y)=−$\Phi_1$ (x, y) (S26). In step S28, the computer 72 stores the phase distortion correction pattern data $C_1$ (x, y) in the recording medium 74 such as a flexible disk, a CD-ROM, or a DVD. Alternatively, the computer 72 stores the data $C_1$ (x, y) and the program for generating distortion corrected patterns (pattern-adding process S1 shown in FIG. 7(B)) as an integrated package in the recording medium. The manufacturer provides a user with a combination of the laser process apparatus 1 and the recording medium 74. The user stores the phase distortion correction pattern data $C_1$ (x, y) in the distortion-correction pattern memory unit 60d from the recording medium 74 through the distortion-correction pattern input unit 60k. The user can read the program for generating distortion corrected patterns through the reading device 65 to store the program in the hard disk drive 61.

In step S28, the computer 72 may upload the phase distortion correction pattern data $C_1$ (x, y) or an integrated package composed of the data $C_1$ (x, y) and the program for generating distortion corrected patterns to the network 68. In this case, the user downloads the phase distortion correction pattern data $C_1$ (x, y) from the network 68 through the distortion-correction pattern input unit 60k to store the downloaded data into the distortion-correction pattern memory unit 60d. The user can download the program for generating distortion corrected patterns from the network 68 through the NCU 67 to store the program.

The laser process apparatus 1 which is provided to the user in the above manner performs the modulation process of FIGS. 7(A) and 7(B) in the same way as that of the first embodiment. That is to say, a desired CGH pattern H (x, y) is read from the pattern memory unit 60a, and the phase distortion correction pattern $C_1$ (x, y) is read from the distortion-correction pattern memory unit 60d. Then, these patterns are added together to generate a phase distortion corrected pattern H' (x, y), which is then used in the phase modulation process.

(First Modification)

Before arranging the reading light source 10, the spatial filter 20, the collimate lens 30 and the phase modulation module 40 to manufacture the laser process apparatus 1, the manufacturer may obtain a distortion correction pattern $C_2$ (x, y) for correcting the wavefront distortion $\Phi_2$ (x, y) resulting from the optical components 10, 20, 30 and 150b. In other words, the manufacturer first arranges the reading light source 10, the spatial filter 20, the collimate lens 30, and the phase modulation module 40 in the same manner as those of the laser process apparatus 1 (FIG. 1), and then loads the above components into the measuring equipment 70 as samples. Next, the measuring process (S10) shown in FIG. 9(A) is started. The reading light source 10 is turned on, and then the wavefront detector 220 measures the phase distortion pattern $\Phi_2$ (x, y) of the light emitted from the PAL-SLM 150. The phase modulation module 40 remains off while the detector 220 is measuring the pattern $\Phi_2$ (x, y). That is, the writing light source 110 remains off. No drive signals are applied to the LCD 130, and no AC voltage is applied to the PAL-SLM 150. The results of the measuring are stored into the computer 72. The computer 72 performs the pattern-calculating process (S20) shown in FIG. 9(B) to calculate a phase distortion correction pattern $C_2$ (x, y)=$-\Phi_2$ (x, y) (S26). The computer 72 stores only the phase distortion correction pattern data $C_2$ (x, y) into the recording medium 74 such as a flexible disk, a CD-ROM or a DVD (S28). Alternatively, the computer 72 stores the integrated package composed of the data $C_2$ (x, y) and the program for generating distortion corrected patterns (the pattern-adding process S1 shown in FIG. 7(B)) into the medium 74. The manufacturer provides the user with a combination of the laser process apparatus 1 and the recording medium 74.

Alternatively, the computer 72 may upload the phase distortion correction pattern data $C_2$ (x, y) singly or an integrated package composed of the data $C_2$ (x, y) and the program for generating distortion corrected patterns to the network 68. In this case, the user stores the phase distortion correction pattern data $C_2$ (x, y) into the distortion-correction pattern memory unit 60d from the recording medium 74 or the network 68 through the distortion-correction pattern input unit 60k. Further, the user can store the program for generating distortion corrected patterns into the hard disk drive 61 from the network 68 or the recording medium 74.

The laser process apparatus 1 provided to the user in the above described manner performs the phase modulation process of FIGS. 7(A) and 7(B) in the same way as that of the second modification of the first embodiment. Namely, a desired CGH pattern H (x, y) is read from the pattern memory unit 60a, and the phase distortion correction pattern $C_2$ (x, y) is read from the distortion-correction pattern memory unit 60d. Then, these patterns are added together to generate a phase distortion corrected pattern H' (x, y), which is used in the phase modulation process.

(Second Modification)

Before arranging the phase modulating module 40 to manufacture the laser process apparatus 1, the manufacturer may obtain a distortion correction pattern $C_{150}$ (x, y) for correcting the wavefront distortion $\Phi_{150}$ (x, y) resulting from the reading-side transparent substrate 150b of PAL-SLM 150. That is, the manufacturer first arranges the phase modulation module 40 or the PAL-SLM 150 in the measuring equipment 70 in the same manner as that of the third modification of the first embodiment. Then, the measuring process (S10) shown in FIG. 9(A) is carried out, so that the wavefront detector 220 measures the phase distortion pattern $\Phi_{150}$ (x, y) of the light emitted from the PAL-SLM 150 that is not activated. The result of the measuring, $\Phi_{150}$ (x, y), is stored into the computer 72. The computer 72 performs the pattern-calculating process (S20) shown in FIG. 9(B) to calculate a phase distortion correction pattern $C_{150}$ (x, y)=$-\Phi_{150}$ (x, y) (S26). The computer 72 stores the phase distortion correction pattern data $C_{150}$ (x, y) singly into the recording medium 74 such as a flexible disk, a CD-ROM or a DVD (S28). The computer 72 may alternatively store an integral package composed of the data $C_{150}$ (x, y) and the program for generating distortion corrected patterns (the pattern-adding process S1 shown in FIG. 7(B)) into the medium 74. The manufacturer provides the user with a combination of the laser process apparatus 1 and the recording medium 74. Alternatively, the computer 72 may upload the phase distortion correction pattern data $C_{150}$ (x, y) singly or an integral package composed of the data $C_{150}$ (x, y) and the program for generating distortion corrected patterns to the network 68. The user stores the phase distortion correction pattern data $C_{150}$ (x, y) into the distortion-correction pattern memory unit 60d from the recording medium 74 or the network 68 through the distortion-correction pattern input unit 60k. Alternatively, the user can store the program for generating distortion corrected patterns into the hard disk drive 61 from the recording medium 74 or the network 68.

The laser process apparatus 1 provided to the user in the above described manner performs the modulation process of FIGS. 7(A) and 7(B) in the same way as that of the third modification of the first embodiment. Namely, a desired CGH pattern H (x, y) is read from the pattern memory unit 60a, and the phase distortion correction pattern $C_{150}$ (x, y) is read from the distortion-correction pattern memory unit 60d. Then, these patterns are added together to generate a phase distortion corrected pattern H' (x, y), which is used in the phase modulation process.

(Third Modification)

Before arranging the reading light source 10, the spatial filter 20, the collimate lens 30, and the phase modulation module 40 to manufacture the laser process apparatus 1, the manufacturer may obtain distortion correction patterns $C_{10}$ (x, y), $C_{20}$ (x, y), $C_{30}$ (x, y), and $C_{150}$ (x, y) for correcting the wavefront distortion $\Phi_{10}$ (x, Y), $\Phi_{20}$ (x, y), $\Phi_{30}$ (x, y), and $\Phi_{150}$ (x, y) resulting from the optical components 10, 20, 30, and 150b, respectively. That is, the manufacturer arranges the reading light source 10, the spatial filter 20, the collimate lens 30, and either one of the phase modulation module 40 and the PAL-SLM 150 which are not activated in turn in the measuring equipment 70 in the same manner as that of the fourth modification of the first embodiment. Then, the measuring process (S10) shown in FIG. 9(A) is carried out, so that the wavefront distortions $\Phi_{10}$ (x, y), $\Phi_{20}$ (x, y), $\Phi_{30}$ (x, y), and $\Phi_{150}$ (x, y) are measured by the use of the wavefront detector 220. The results of the measuring $\Phi_{10}$ (x, y), $\Phi_{20}$ (x, y), $\Phi_{30}$ (x, y) and $\Phi_{150}$ (x, y) are stored into the computer 72. The computer 72 performs the pattern-calculating process (S20) shown in FIG. 9(B) to obtain a phase distortion correction patterns $C_{10}$ (x, y)=$-\Phi_{10}$ (x, y), $C_{20}$ (x, y)=$\Phi_{20}$ (x, y), $C_{30}$ (x, y)=$-\Phi_{30}$ (x, y) and $C_{150}$ (x, y)=$-\Phi_{150}$ (x, y) (S26). The computer 72 stores the phase distortion correction pattern data $C_{10}$ (x, y), $C_{20}$ (x, y), $C_{30}$ (x, y), and $C_{150}$ (x, y) singly into the recording medium 74 such as a flexible disk, a CD-ROM or a DVD. Alternatively, the computer 72 may store an integral package composed of these data and the program for generating distortion corrected patterns (the pattern-adding process S1 shown in FIG. 7(B)) into the medium 74 (S28). The manufacturer provides the user with a combination of the laser process apparatus 1 and the recording medium 74. Alternatively, the computer 72 may upload the phase distortion correction pattern data $C_{10}$ (x, y), $C_{20}$ (x, y), $C_{30}$ (x, y), and $C_{150}$ (x, y), singly or an integral package composed of these data and the program for generating distortion corrected patterns to the network 68 in S28. The user stores the phase distortion correction pattern data $C_{10}$ (x, y), $C_{20}$ (x, y), $C_{30}$ (x, y), and $C_{150}$ (x, y) into the distortion-correction pattern memory unit 60d from the recording medium 74 or the network 68 through the distortion-correction pattern input unit 60k. Further, the user can store the program for generating distortion corrected patterns into the hard disk drive 61 from the recording medium 74 or the network 68.

The laser process apparatus 1 provided to the user in the above described manner performs the modulation process of FIGS. 7(A) and 7(B) in the same way that of the fourth modification of the first embodiment. Namely, a desired CGH pattern H (x, y) is read from the pattern memory unit 60a, and the phase distortion correction patterns $C_{10}$ (x, y), $C_{20}$ (x, y), $C_{30}$ (x, y) and $C_{150}$ (x, y) are read from the distortion-correction pattern memory unit 60d. Then, these patterns are added together, to generate a phase distortion corrected pattern H' (x, y), which is used in the phase modulation process.

(Third Embodiment)

A laser process apparatus 1 and a laser process method according to the third embodiment of the invention will be described with reference to FIG. 13.

In the present embodiment, as shown in FIG. 13, the controller 60 has a distortion-correction pattern input unit 60k, similarly to the second embodiment. As in the first embodiment, the controller 60 includes a distortion pattern input unit 60h, a distortion pattern memory unit 60b, and a distortion-correction pattern generating unit 60c.

In this embodiment, a manufacturer obtains a phase distortion correction pattern $C_{150}$ (x, y) for correcting the wavefront distortion $\Phi_{150}$ (x, y) (=$-C_{150}$ (x, y)) resulting from the reading-side transparent substrate 150b of PAL-SLM 150, before arranging the phase modulating module 40 to manufacture the laser process apparatus 1 in the same manner as that of the second modification of the second embodiment. That is, the manufacturer first arranges the phase modulation module 40 or the PAL-SLM 150 in the measuring equipment 70. Using the computer 72, the manufacturer carries out the process for generating a distortion correction pattern (FIG. 9(A), FIG. 9(B)). The resultant first phase distortion correction pattern $C_{150}$ (x, y) singly or an integral package composed of the pattern $C_{150}$ (x, y) and one of the program for generating distortion corrected patterns (the pattern-adding process S1 shown in FIG. 7(B) and the program for generating distortion correction patterns (S20 shown in FIG. 9(B)) is stored into the recording medium 74 such as a flexible disk, a CD-ROM or a DVD, or uploaded to the network 68.

The user stores the first phase distortion correction pattern data $C_{150}$ (x, y) into the distortion-correction pattern memory unit 60d from the recording medium 74 or the network 68. Note that the user stores the program for generating distortion corrected patterns and the program for generating distortion correction patterns into the controller 60.

As is the case with the fifth modification of the first embodiment, the user arranges the beam sampler 200 and the wavefront detector 210 downstream of the collimate lens 30 to carry out the process of generating a distortion correction pattern (FIG. 9(A), FIG. 9(B)). Accordingly, the wavefront detector 210 measures the wavefront distortion $\Phi_1$ (x, y) resulting from the reading light source 10, the spatial filter 20, and the collimate lens 30. The wavefront distortion data $\Phi_1$ (x, y) is stored into the distortion pattern memory unit 60b through the distortion pattern input unit 60h. The distortion-correction pattern generating unit 60c obtains a phase distortion correction pattern $C_1$ (x, y) for correcting this wavefront distortion data $\Phi_1$ (x, y) (=$-C_1$ (x, y)). The data $C_1$ (x, y) is stored as a second phase distortion correction pattern into the distortion-correction pattern memory unit 60d.

In this modification, the modulation process of FIGS. 7(A) and 7(B) is performed in the same way as in the case of the fifth modification of the first embodiment. That is to say, a desired CGH pattern H (x, y) is read from the pattern memory unit 60a, and the phase distortion correction patterns data $C_1$ (x, y) and $C_{150}$ (x, y) are read from the distortion-correction pattern memory unit 60d. Then, these patterns are added together to generate a phase distortion corrected pattern H' (x, y), which is used in the phase modulation process.

To form an image of letter "↵" on the process target T, for example, the adder unit 60e reads CGH pattern data H (x, y) for forming the letter "↵" from the pattern memory unit 60a.

Figure 14A:
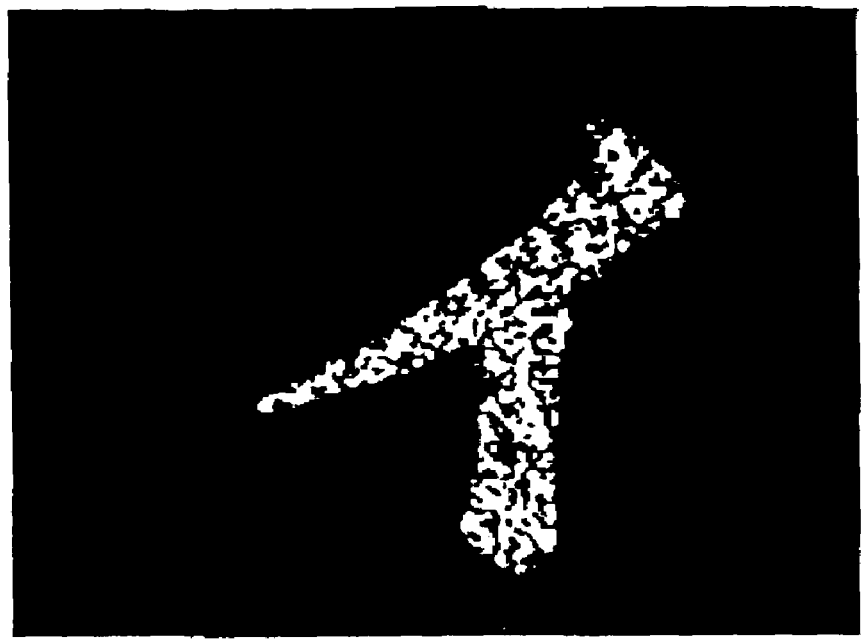
FIG. 14(A) is a view showing the image of a pattern obtained by performing Fourier transform on the phase-modulated light that has been generated by means of a phase-distortion-corrected pattern H' (x, y) having a corrected wavefront correction in the third embodiment of the present invention.

The adder unit 60e reads the phase distortion correction pattern data $C_1$ (x, y) and $C_{150}$ (x, y) from the distortion-correction pattern memory unit 60d. The adder unit 60e adds the CGH pattern data H (x, y) and the phase distortion correction pattern data $C_1$ (x, y) and $C_{150}$ (x, y) to generate phase distortion corrected pattern data H' (x, y). The phase modulation module 40 performs phase modulation process in accordance with the phase distortion corrected pattern data H' (x, y). Therefore, the letter "↵" is formed without any distortion on the process target T, as is illustrated in FIG. 14(A).

Figure 14B:
FIG. 14(B) is a view showing the image of a pattern obtained by performing Fourier transform on the phase-modulated light that has been generated by means of a CGH pattern H (x, y) without the wavefront being corrected.

If the CGH pattern H (x, y) for forming the letter "↵" is not added to the phase distortion correction pattern $C_1$ (x, y) and/or the phase distortion correction pattern $C_{150}$ (x, y), and the phase modulation module 40 performs the phase modulation process on the basis of the CGH pattern data H (x, y), a letter "↵" is focused to form the image having distortion caused due to the wavefront distortion of the reading light on the process target T, as illustrated in FIG. 14(B). Note that FIGS. 14(A) and 14(B) show images photographed by a CCD device that is placed at the position where the process target T should be located.

In this embodiment, the beam sampler 200 and the wavefront detector 210 may be removably connected to the laser process apparatus 1 as in the case of the first embodiment, or may be fixed in the apparatus 1 as in the case of the first modification of the first embodiment.

A manufacturer of the laser process apparatus 1 may use the measuring equipment 70 and computer 72 beforehand as in the case of the second embodiment to obtain the phase distortion correction pattern $C_1$ (x, y) for collecting the wavefront distortion data $\Phi_1$ (x, y) (=$-C_1$ (x, y)) resulting from the reading light source 10, the spatial filter 20, and the collimate lens 30. In this case, either one, or combination of the phase distortion correction pattern data $C_1$ (x, y) and $C_{150}$ (x, y) can be stored into the recording medium 74 singly or as an integral package composed of these pattern data and the program for generating distortion corrected patterns, or uploaded to the network 68.

(Fourth Embodiment)

A laser process apparatus and a laser process method according to the fourth embodiment of the invention will be described with reference to FIGS. 8 and 15.

In the laser process apparatus 1 of this embodiment, the beam sampler 200 and the wavefront detector 210 are mounted in a similar manner to the case of the first modification of the first embodiment as shown in FIG. 8. In other words, the laser process apparatus 1 according to the present embodiment includes a reading light source 10, a spatial filter 20, a collimate lens 30, a phase modulation module 40, a Fourier lens 50, a controller 60, a beam sampler 200, and a wavefront detector 210, as is illustrated in FIG. 8. The beam sampler 200 is provided downstream of the collimate lens 30 to reflect part of the incident light and guides the reflected light to the wavefront detector 210. The controller 60 has the same configuration as that of the first embodiment (FIG. 2 and FIG. 4). In FIG. 8, only the components 60g and 60h of the controller 60 are illustrated, the other components 60a to 60f, 60i and 60j are omitted.

Figure 15:
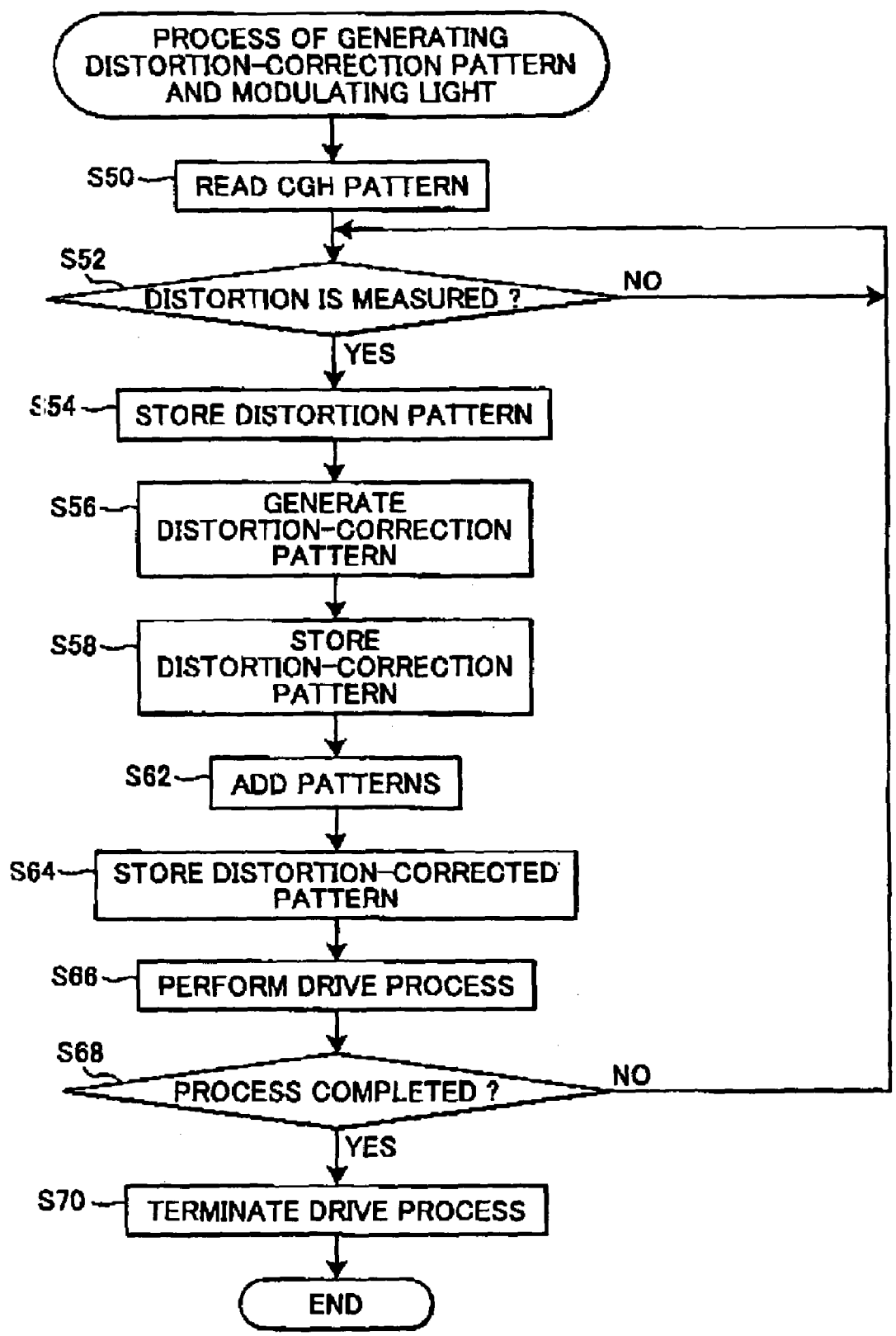
FIG. 15 is a flowchart explaining a process to generate a distortion correction pattern and modulate light in a fourth embodiment of the present invention.

The present embodiment differs from the first embodiment in that the program for generating distortion correction patterns and performing the modulation process which is shown in FIG. 15 is stored in the hard disk drive 61 or ROM 64 (FIG. 2) instead of the program for generating distortion correction patterns (FIGS. 9(A) and 9(B)) and the program for performing the modulation (FIGS. 7(A) and 7(B)). The program for generating distortion correction patterns and performing the modulation may be stored in a recording medium in advance, and then stored in the hard disk drive 61 through the reading device 65. Alternatively, the program may be uploaded to the network 68 and then downloaded via the NCU 67.

In the laser process apparatus 1, the laser light from the reading light source 10 sometimes has dynamic fluctuation. In addition, air in the optical path extending from the reading light source 10 to the collimate lens 30 through the spatial filter 20 may vibrate. In these case, the wavefront distortion occurring downstream of the collimate lens 30 (i.e., distortion indicated by the curving line in FIG. 8) contains the dynamic wavefront distortion, as well as the static wavefront distortion resulting from the structures of the reading light source 10, the spatial filter 20, and the collimate lens 30.

Hence, in the present embodiment, in order to remove the dynamic wavefront distortion as well as the static wavefront distortion, the measurement of the phase distortion $\Phi_1$ (x, y) at the wavefront of the reading light is repeated during the phase modulation to send the result of measurement periodically to the controller 60. The controller 60 generates phase distortion correction pattern data $C_1$ (x, y) based on the received measuring result $\Phi_1$ (x, y) and then adds the phase distortion correction pattern data $C_1$ (x, y) to a desired CGH pattern data H (x, y) to obtain the phase distortion corrected pattern data H' (x, y). Thus, the modulation is performed by repeating update of the phase distortion corrected pattern H' (x, y) on the basis of the latest measurement of the phase distortion $\Phi_1$ (x, y).

To be more specific, in this embodiment, the wavefront detector 210 performs real-time measurement of the wavefront distortion occurring downstream of the collimate lens 30 to repeatedly send the resultant phase distortion pattern data $\Phi_1$ (x, y) to the controller 60. In this embodiment, note that the resultant phase distortion pattern $\Phi_1$ (x, y) contains both the static distortion and the dynamic distortion resulting from the optical components that are arranged upstream of the beam sampler 200 (the reading light source 10, the spatial filter 20, and the collimate lens 30). Note that the beam sampler 200 passes and guides most of the incident light to the phase modulation module 40, so that most of the reading light from the reading light source 10 can be used for is the target processing.

The operation of the laser process apparatus 1 of this embodiment (generation of a distortion correction pattern and phase modulation) will be described with reference to FIG. 15.

Before instructing the controller 60 to perform the generation of a distortion correction pattern and the phase modulation (target processing), a user starts driving the reading light source 10 and the writing light source 110. At the same time, the user instructs the wavefront detector 210 to repeat detection of a wavefront repeatedly at prescribed intervals. According to the above instruction, the wavefront detector 210 performs the first detection of a wavefront to input the resultant phase distortion pattern data $\Phi_1$ (x, y) to the controller 60.

Next, the user instructs the controller 60 to perform the target processing. The controller 60 then reads the CGH pattern H (x, y) to be used for the target processing from the pattern memory unit 60a (S50).

Then, it is determined whether or not the controller 60 received the latest measured distortion pattern $\Phi_1$ (x, y) from the wavefront detector 21. In this case, since the controller 60 receives the result of the first wavefront detection (Yes in S52), the phase distortion pattern data $\Phi_1$ (x, y) is stored into the distortion pattern memory unit 60b (S54).

Next, the distortion-correction pattern generating unit 60c generates a phase distortion correction pattern $C_1$ (x, y)=−$\Phi_1$ (x, y) (S56) to store the pattern $C_1$ (x, y) into the distortion-correction pattern memory unit 60d (S58).

Thereafter, the adder unit 60e adds the CGH pattern H (x, y) and the phase distortion correction pattern $C_1$ (x, y) (S62). If the result of the addition has a negative value or another value equal to or greater than 2π, the adder unit 60e performs the phase turn-up process as in the case of the step S4 in the first embodiment. The adder unit 60e stores the resultant phase distortion corrected pattern H' (x, y) into the distortion-corrected pattern memory unit 60f (S64).

The control unit 60g generates a drive signal on the basis of the phase distortion corrected pattern H' (x, y) and starts supplying the drive signal to the LCD 130 to start the drive process (S66).

When the drive operation (i.e., process) is started as the above manner, it is determined whether the target processing is terminated, that is, whether a preset process time has elapsed since the start of the drive process (S68). If the preset process time has not elapsed (No in S68), the operation returns to S52. Note that the control unit 60g keeps supplying the drive signal generated in S66 to the LCD 130 until the drive signal is updated next time.

The wavefront detector 210 repeats the detection of the wavefront at the prescribed intervals. The intervals are significantly shorter than the preset processing time, and longer than the time that the controller 60 requires to carry out one sequence of steps S52 to S68. Every time the wavefront detector 210 performs one detection of the wavefront, the wavefront detector 210 sends the resultant phase distortion pattern data $\Phi_1$ (x, y) to the controller 60.

When the process returns to step S52, the controller 60 determines whether the latest measured phase distortion pattern data $\Phi_1$ (x, y) has been input from the wavefront detector 210. If the data has not been input (No in S52), the controller 60 waits until the data is input. If the data has been input (Yes in S52), the latest phase distortion pattern $\Phi_1$ (x, y) sent to the controller 60 is stored (S54) to renew a phase distortion correction pattern data $C_1$ (x, y) (S56, S58). The adder unit 60e adds the renewed phase distortion correction pattern $C_1$ (x, y) to the desired phase pattern data H (x, y) to generate a new phase distortion corrected pattern H' (x, y) (S62, S64). The control unit 60g updates the drive signal (S66) in accordance with the new phase-distortion corrected pattern H' (x, y). The control unit 60g supplies the drive signal updated above to the phase modulation module 40 to keep performing the drive process (target processing). Thus, the operation consisting of the steps S56 to S68 is repeated.

As described above, every time the latest measured phase distortion pattern data $\Phi_1$ (x, y) is received by the controller 60 from the wavefront detector 210, the phase distortion correction pattern $C_1$ (x, y) is updated. The updated phase distortion correction pattern $C_1$ (x, y) is added to the desired phase pattern data H (x, y) to generate a phase distortion corrected pattern H' (x, y). The drive signal is renewed in accordance with the phase distortion corrected pattern H' (x, y) so that the target processing is continued on the basis of the renewed the drive signal. Thus, the drive signal is renewed and supplied to the LCD 130, every time the latest measured phase distortion pattern data $\Phi_1$ (x, y) is received.

If the preset process time period has elapsed since the start of the drive process (target processing), and reached the timing that the drive process should be over (Yes in S68), the control unit 60g stops supplying the drive signal to terminate the drive process (S70), and then terminate the target processing. Both the reading light source 10 and the writing light source 110 are turned off.

Thus, according to the present embodiment, the phase modulation module 40 can be driven with the phase distortion corrected pattern H' (x, y) which has corrected the latest measured wavefront distortion $\Phi_1$ (x, y). Hence, not only the static distortion but also the dynamic distortion can be reliably corrected, so that the phase-modulated light having the desired CGH pattern H (x, y) can be generated with higher accuracy.

Moreover, in the present embodiment, the phase distortion correction pattern $C_1$ (x, y) is renewed and the phase distortion corrected pattern H' (x, y) is renewed, every time the controller 60 receives the phase distortion pattern $\Phi_1$ (x, y) measured by the wavefront detector 210. The target processing is continued in accordance with the renewed phase distortion corrected pattern H' (x, y). That is, the controller 60 renews the phase distortion corrected pattern H' (x, y) to modify the target processing, every time the wavefront detector 210 performs one detection operation to generate a phase distortion pattern $\Phi_1$ (x, y). Therefore, a real-time control can be accomplished with high precision.

In the above explanation, the detection cycle of the wavefront detector 210 is longer than the time period for the controller 60 to perform one sequence of steps S52 to S68. However, if the detection cycle and timing of the wavefront detector 210 is set identical to the time and timing required for the controller 60 to perform the sequence of steps S52 to S68, the decision made in step S52 can be always "Yes."

(First Modification)

The first modification of the present embodiment will be described below.

In this modification, the controller 60 has the configuration of FIG. 13 as in the case of the third embodiment. Note that the beam sampler 200 and the wavefront detector 210 are fixed in the laser process apparatus 1.

In the present modification, the manufacturer uses the measuring equipment 70 to measure a distortion pattern $\Phi_{150}$ (x, y) resulting from the reading-side transparent substrate 150b of PAL-SLM 150, before arranging the phase modulating module 40 as in the case of the third embodiment to manufacture the laser process apparatus 1. The manufacturer then uses the computer 72 to obtain a phase distortion correction pattern $C_{150}$ (x, y) (=$-\Phi_{150}$ (x, y)). The computer 72 records the phase distortion correction pattern data $C_{150}$ (x, y), as a first phase distortion correction pattern in the recording medium 74 such as a flexible disk, a CD-ROM or a DVD. The first phase distortion correction pattern data $C_{150}$ (x, y) may be recorded together with the program for generating the distortion correction patterns and performing the modulation (FIG. 15) in the form of a package. The manufacturer provides the user with a combination of the laser process apparatus 1 and the recording medium 74. Alternatively, the manufacturer may upload to the network 68 the first phase distortion correction pattern $C_{150}$ (x, y) singly or an integral package including the pattern $C_{150}$ (x, y) and the program for generating the distortion correction patterns and performing the modulation (FIG. 15). The user stores the first phase distortion correction pattern data $C_{150}$ (x, y) into the distortion-correction pattern memory unit 60d through the reading device 65 or the NCU 67 (the distortion-correction pattern input unit 60k).

In accordance with the user's instruction for the target processing, the controller 60 causes the beam sampler 200 and wavefront detector 210 in the laser process apparatus 1 to measure the distortion $\Phi_1$ (x, y) occurring downstream of the collimate lens 30 repeatedly in real time. Thus, the phase distortion correction pattern $C_1$ (x, y) (=$-\Phi_1$ (x, y)) as a second phase-distortion correction pattern is repeatedly renewed.

Namely, the controller 60 performs the process for generating the distortion correction patterns and performing the modulation of FIG. 15, as will be described below.

If the phase distortion pattern $\Phi_1$ (x, y) is received from the wavefront detector 210 (Yes in S52), the phase distortion pattern data $\Phi_1$ (x, y) is stored in the distortion pattern memory unit 60b (S54). Thereafter, a phase-distortion correction pattern data $C_1$ (x, y) (=$-\Phi_1$ (x, y)) is obtained as the second phase distortion correction pattern (S56) to be stored into the distortion-correction pattern memory unit 60d (558).

The phase distortion correction pattern data $C_{150}$ (x, y) for correcting the static distortion resulting from the reading-side transparent substrate 150b of PAL-SLM 150 is already stored in the distortion-correction pattern memory unit 60d stores as a first phase-distortion correction pattern. Therefore, in step S62, the adder unit 60e adds the first phase distortion correction pattern data $C_{150}$ (x, y) and the second phase distortion correction pattern data $C_1$ (x, y) to a desired CGH pattern data H (x, y). Thus, the phase distortion corrected pattern data H' (x, y) is obtained, and the drive signal is renewed. The phase distortion corrected pattern data H' (x, y) and the renewed drive signal are supplied to the LCD 130.

In this modification, the static distortion resulting from the optical components 10 to 30, the static distortion resulting from the reading-side transparent substrate 150b of PAL-SLM 150, and the dynamic distortion resulting from the optical path defined by the optical components 10 to 30 can be reliably removed. Accordingly, it is possible to generate phase-modulated light at high precision.

(Second Modification)

In the present modification, the controller 60 has the configuration of FIG. 10 as in the case of the second modification of the first embodiment. The beam sampler 200 and the wavefront detector 210 are placed and fixed in the laser process apparatus 1.

In the laser process apparatus 1, if air vibrates in the optical path extending along the optical components 30 and 40, the wavefront distortion occurring downstream of the phase modulation module 40 (the distortion indicated by the curving line in FIG. 10) contains dynamic distortion. To remove such dynamic distortion, it is sufficient to perform the process of generating the distortion correction pattern and performing the modulation of the present embodiment (FIG. 15) when the beam sampler 200 is arranged downstream of the phase modulation module 40 as illustrated in FIG. 10. In this modification, the static distortion resulting from the structures of the optical components 10 to 30 and 150b and the dynamic distortion resulting from the optical path extending along the optical components 10 and 40 can be reliably removed. It is therefore possible to generate light that is phase-modulated with a desired phase pattern H (x, y) at high precision.

To perform the process of generating the distortion correction patterns and performing the modulation of FIG. 15 in the present modification, the control unit 60g keeps the phase modulation module 40 off while the wavefront detector 210 is operating. That is, the control unit 60g suspends supplying the drive signal to the LCD 130, turns off the writing light source 110, and suspends applying an AC voltage to the PAL-SLM 150. When the wavefront detector 210 operates while the phase modulation module 40 remains on, the detected wavefront pattern may contain the wavefront distortion due to the CGH pattern displayed on the phase modulation module 40. In this case, it is impossible to detect the wavefront distortion resulting from only the optical components and the optical path independently of the wavefront distortion due to the CGH pattern.

If the dynamic distortion occurs at any position in the optical path other than the phase modulation module 40, it is possible to arrange the beam sampler 200 and the wavefront detector 210 so as to detect the dynamic distortion at that position, and then to carry out the process of generating distortion the correction patterns and performing the modulation (FIG. 15). The dynamic distortion can be removed by measuring the dynamic distortion in real time and repeatedly supplying the resultant dynamic distortion to the controller 60.

(Fifth Embodiment)

The first to fourth embodiments described above are made by applying a phase modulating apparatus and a phase modulating method according to the present invention to a laser process apparatus and a laser process method. However, the phase modulating apparatus and phase modulating method of the present invention can be applicable to any phase modulating apparatus and phase modulating method that use a phase modulation module 40 to phase-modulate reading light as well as the laser process apparatus and method. It is possible to measure a wavefront distortion resulting from optical components such as the phase modulation module 40 and the optical path in real time or in advance to calculate a wavefront-distortion correction pattern for correcting the measured wavefront distortion and then add the calculated wavefront-distortion correction pattern to a desired phase pattern.

More specifically, before shipping the phase modulation module 40, the manufacturer of the phase modulation module 40 uses the measuring equipment 70 to generate a wavefront distortion pattern $\Phi_{150}$ (x, y) resulting from the reading-side transparent substrate 150b of PAL-SLM 150 of each phase modulation module 40. The way to measure the wavefront distortion pattern $\Phi_{150}$ (x, y) is the same as that of the second modification of the second embodiment (FIG. 12). The computer 72 calculates a phase distortion correction pattern $C_{150}$ (x, y)=−$\Phi_{150}$ (x, y) on the basis of the measuring result $\Phi_{150}$ (x, y). The resultant phase distortion correction pattern data $C_{150}$ (x, y) is stored in the recording medium 74 such as a flexible disk, a CD-ROM, or a DVD in the form of an integral package with the program for generating the distortion corrected patterns (the pattern-adding process S1 shown in FIG. 7(B)) and the drive program (the drive process S7 shown in FIG. 7(A)). The manufacturer then provides the recording medium 74 to the user in combination with the phase modulation module 40.

A user assembles a desired phase modulating apparatus with the phase modulation module 40. The phase modulating apparatus may have an identical configuration to the laser process apparatus 1 shown in FIG. 12. The phase modulating apparatus may be formed by placing a process target T on the Fourier plane of the Fourier-transform lens 50 or by placing a desired device such as an imaging device for acquiring a Fourier-transform image. Note that the controller 60 has the structure shown in FIG. 12, for example. The user stores the phase distortion correction pattern data $C_{150}$ (x, y), the program for generating the distortion corrected patterns (the pattern-adding process S1 of FIG. 7(B)), and the drive program (the drive process S7 of FIG. 7(A)) into the controller 60. As a result, the controller 60 can perform the phase modulation of FIGS. 7(A) and 7(B). In other words, the controller 60 adds the desired CGH pattern H (x, y) and the phase distortion correction pattern $C_{150}$ (x, y) together to generate a phase distortion corrected pattern data H' (x, y), thereby performing the phase modulation.

As described above, the recording medium 74 stores the phase distortion correction pattern $C_{150}$ (x, y) inherent to the reading-side transparent substrate 150b of PAL-SLM 150 in the phase modulation module 40, the program for generating the distortion corrected patterns (FIG. 7(B)), and the drive program. By combining the above recording medium 74 with the phase modulation module 40, the user can phase-modulate light fast and quickly in accordance with the distortion corrected pattern without measuring the wavefront distortion of the incident light to the PAL-SLM 150, when phase modulation of light is performed by using the phase modulating apparatus incorporating the PAL-SLM 150.

Using this phase modulation module 40, the user can produce any type of phase modulating apparatus such as an apparatus for generating hologram-reproducing patterns or a wave-shaping apparatus for use with a femtosecond laser.

Figure 16:
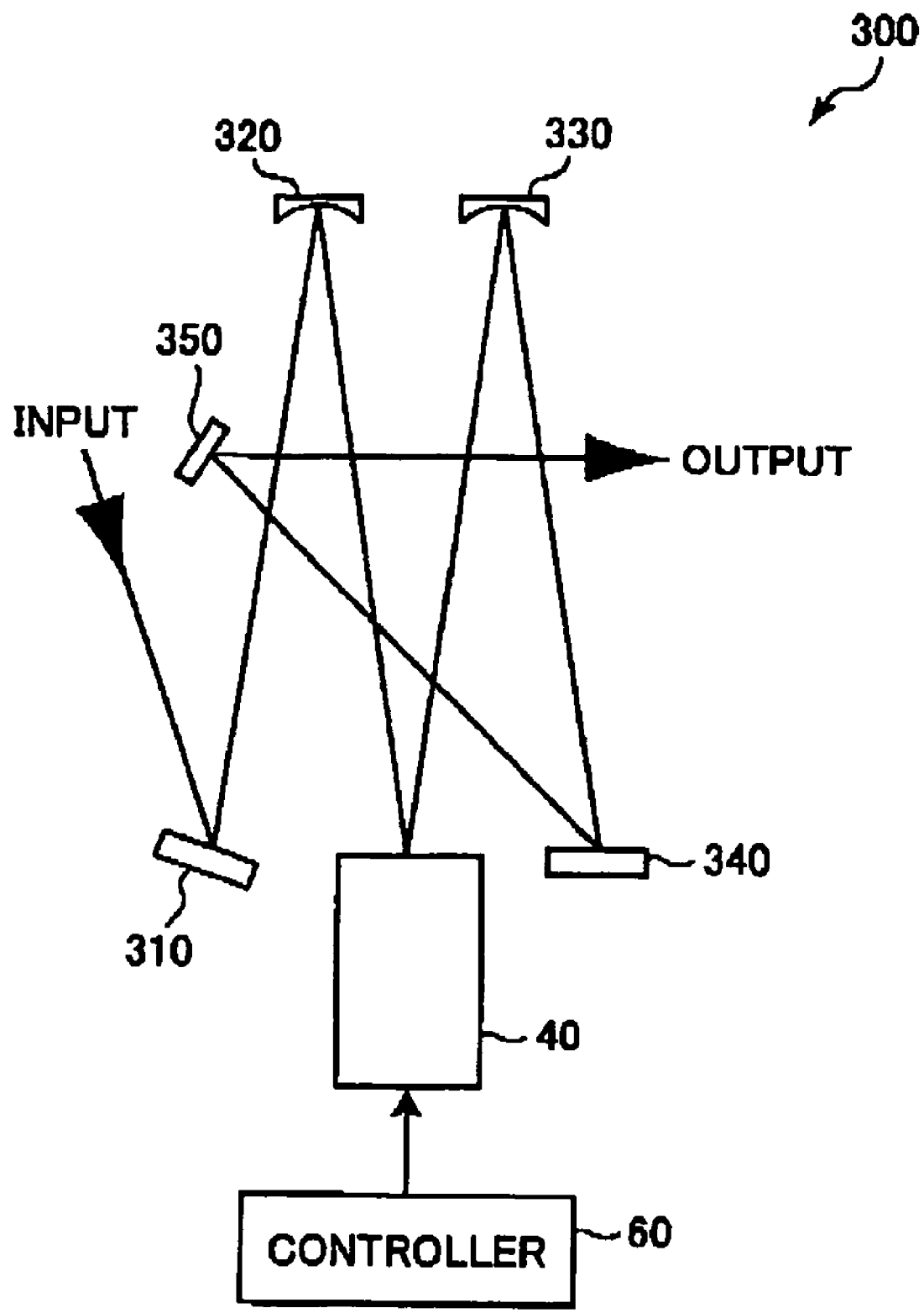
FIG. 16 is a block diagram illustrating the configuration of a wave-shaping device for use in the femtosecond laser according to a fifth embodiment of the present invention.

The following description will be made for explaining the case in which a wave-shaping apparatus for use with a femtosecond laser is manufactured by using the phase modulation module 40, with reference to FIG. 16.

Note that the wave-shaping apparatus for use with a femtosecond laser is an apparatus that separates a femtosecond laser beam into spectra to modulate each spectrum at the spectral plane, thereby shaping a pulse shape or a pulse width.

The wave-shaping apparatus 300 for use with the femtosecond laser beam includes a first grating 310, a first cylindrical mirror 320, a phase modulation module 40, a second cylindrical mirror 330, a second grating 340, an output mirror 350, and a controller 60. The phase modulation module 40 has the same configuration as that of FIG. 3. The controller 60 has the configuration as shown in in FIG. 12. After producing the wave-shaping apparatus 300 for use with the femtosecond laser, a user stores the phase distortion correction pattern data $C_{150}$ (x, y) from the recording medium 74 or the network 68 into the distortion-correction pattern memory unit 60d in the controller 60. The user generates a desired phase pattern H (x, y) to stores the desired phase pattern H (x, y) into the pattern memory unit 60a.

A femtosecond laser beam is divided into spectra by the first grating 310, reflected by the first cylindrical mirror 320, and guided into to the PAL-SLM 150 of the phase modulation module 40 in the same manner as that of the case shown in FIG. 3. That is, the wavelength components of the femtosecond laser beam decomposed spacially are incident on the PAL-SLM 150. Note that the desired phase pattern H (x, y) stored in the pattern memory unit 60a is used to phase-modulate each decomposed wavelength component on the xy plane in a particular manner. The adder unit 60e in the controller 60 adds the phase pattern H (x, y) and the phase distortion correction pattern $C_{150}$ (x, y) together to generate a phase distortion corrected pattern H' (x, y). In accordance with the phase distortion corrected pattern H' (x, y), the control unit 60g generates an LCD drive signal to drive the phase modulation module 40. As a result, the femtosecond laser beam is phase-modulated. Since the phase modulation module 40 is driven in accordance with the phase distortion corrected pattern H' (x, y) obtained by adding the phase distortion correction pattern $C_{150}$ (x, y) to the desired phase pattern H (x, y), each wavelength component can be phase-modulated in a desired manner at high precision. Hence, a desired output pattern can be generated at high precision. After the phase-modulated femtosecond laser beam is reflected by the second cylindrical mirror 330, the phase-modulated femtosecond laser beam is changed by the second grating 340 from the dispersed condition to the focused condition. The phase-modulated femtosecond laser beam is then reflected by the output mirror 350, and emitted outside. Thus, it is possible to emit a femtosecond laser beam that has been rectified pulse wave-shape or pulse width.

Note that the controller 60 may have any one of the structures shown in FIGS. 4, 8, and 10 to 13. The phase distortion $\Phi$ (x, y) resulting from each of the first grating 310, the first cylindrical mirror 320, the second cylindrical mirror 330, the second grating 340, and the output mirror 350 is measured, respectively. And, the phase distortion correction pattern C (x, y), i.e., an inverse pattern of the measured phase distortion pattern (−Φ (x, y)), in conjunction with the phase distortion correction pattern $C_{150}$ (x, y) can be then added to the desired phase pattern H (x, y). Alternatively, the phase distortion Φ (x, y) resulting from at least one or more of the optical components 310 to 340 and the component 150 can be measured together. And the phase distortion correction pattern(s) C (x, y), i.e., inverse pattern(s) of the measured the phase distortions (−Φ (x, y)) can be then added to the desired phase pattern H (x, y). Alternatively, the measurement of the phase distortion Φ (x, y) may be repeated in real time so that the measured results can be sent to the controller 60.

The phase modulating apparatus and phase modulating method according to the present invention are not limited to the embodiments described above. Various changes and modifications can be made within the scope of the claims.

For example, the phase distortion $Φ_{50}$ (x, y) resulting from the Fourier lens 50 in the laser process apparatus 1 of FIG. 1 may be measured to obtain a phase distortion correction pattern $C_{50}$ (x, y) (=−$Φ_{50}$ (x, y)). The Fourier lens 50, for example, is set into the measuring equipment 70 separately from other optical components to measure the phase distortion $Φ_{50}$ (x, y), thereby obtaining the phase distortion correction pattern $C_{50}$ (x, y) (=−$Φ_{50}$ (x, y)). The phase distortion correction pattern $C_{50}$ (x, y) can be added to the desired phase pattern H (x, y) along with the phase distortion correction patterns for the optical components 10 to 30 and 150. Alternatively, the beam sampler 200 may be placed downstream of the Fourier lens 50 to measure the phase distortions φ (x, y) resulting from the optical components 10, 20, 30, 150 and 50 together. A phase distortion correction pattern C (x, y) (=−Φ (x, y)) is obtained to be added to the desired phase pattern H (x, y). In this case, the phase distortions Φ (x, y) may be measured in advance as the case of the first to third embodiments. Alternatively, the phase distortions Φ (x, y) may be repeatedly measured in real time as the case of the fourth embodiment to supply the phase distortion Φ (x, y) to the controller 60.

In the embodiments described above, when the phase distortion $Φ_2$ (x, y) or the phase distortion $Φ_{150}$ (x, y) resulting from the reading-side transparent substrate 150b of PAL-SLM 150 of the phase modulation module 40 is measured, no drive signal is supplied to the LCD 130, the writing light source 110 is turned off, and no AC voltage is applied to the PAL-SLM 150 in order to deactivate the phase modulation module 40. However, it is sufficient not to apply the drive signal at least to the LCD 130. The writing light source 110 may be turned on, and an AC voltage may be applied to the PAL-SLM 150.

Similarly, in the embodiments described above, when the PAL-SLM 150 is set into the measuring equipment 70 and the phase distortion $Φ_{150}$ (x, y) resulting from the reading-side transparent substrate 150b is measured, no AC voltage is applied to the PAL-SLM 150 and no writing light is irradiated in order to deactivate the PAL-SLM 150. However, it is proper to prevent at least the writing light from impinging. An AC voltage can be applied to the PAL-SLM 150.

In the fourth modification of the first embodiment, the wavefront distortions resulting from the reading light source 10, the spatial filter 20, the collimate lens 30, and the reading-side transparent substrate 150b of PAL-SLM 150 are first measured in advance independently from each other by the use of the measuring equipment 70, respectively to obtain the correction patterns for correcting these wavefront distortions and then adding the correction patterns to the desired phase pattern. Instead, the wavefront distortions resulting from the reading light source 10, the spatial filter 20, and the collimate lens 30 may be first obtained independently of each other by using the measuring equipment 70. And, the correction patterns for correcting these wavefront distortions may be then obtained to be added to the desired phase pattern.

In the embodiments described above, the phase turn-up process (S4 in FIG. 7(B) and S62 in FIG. 15) is performed when the CGH pattern H (x, y) and the phase distortion correction pattern C (x, y) are added together. However, the phase turn-up process may be carried out, when the phase distortion correction pattern C (x, y) (S26 in FIG. 9(B), and S56 in FIG. 15) is generated as well as addition of the patterns. That is, the sign of the phase distortion pattern Φ (x, y) is inverted to generate the phase distortion correction pattern C (x, y). And the phase value C (x, y) of a given pixel (x, y) may be replaced with the remainder obtained by dividing the phase value C by 2π, when the phase value C for any pixel (x, y) is equal to or greater than 2π, or less than zero. Further, the phase turn-up process may be carried out for the CGH pattern H (x, y) in advance. And the phase value H (x, y) at a given pixel (x, y) may be replaced with the remainder obtained by dividing the phase value H by 2π, when the phase value H is equal to or greater than 2π, or less than zero.

In the first to the fourth embodiments, the desired phase pattern H (x, y) is a hologram pattern. The desired phase pattern H (x, y) may be any other type of phase pattern rather than a hologram.

The configuration of the phase modulation module 40 is not limited to the one described above. For example, the LCD 130 and the PAL-SLM can be connected together through an optical fiber plate instead of the relay lens 140 as disclosed in International Publication No. WO99/66368. That is, the writing-side transparent substrate 150a is removed from the PAL-SLM 150, and the transparent electrodes 150c is connected to the light-transmitting layer 130b of the LCD 130 by the optical fiber plate. In this case, provided that the numerical aperture $NA_{FOP}$ of the optical fiber plate has the relation of $n_G·P/d < NA_{FOP} < 2\ n_G·P/d$, where P is the pixel pitch in the LCD 130, d is the thickness of the light-transmitting layer 130b, and $n_G$ is the refractive index of the layer 130b at a wavelength λ of light emitted from the writing light source 110, the optical fiber plate can accurately transmit the phase distortion corrected pattern H' (x, y) displayed on the LCD 130 to the PAL-SLM 150, while eliminating the signal component due to the pixel assembly layer 130c of the LCD 130.

Furthermore, the configuration of the LCD 130 is not limited to the one described above. Any type of liquid-crystal display can be used as the LCD 130.

For example, an LCD having a micro-lens array provided on the light-receiving layer 130a can be used as the LCD 130. In this case, the micro-lens array has a plurality of micro-lenses, which are arranged in one-to-one correspondence to the transparent pixel electrodes of the pixel assembly layer 130c. If such a LCD 130 is adopted, any signal component due to the pixel assembly layer 130c of the LCD 130 can be removed by adjusting the position of the relay lens 140 along the optical axis. Hence, the phase distortion corrected pattern H' (x, y) generated by the LCD 130 can be transmitted to the PAL-SLM 150 at high precision.

Additionally, the LCD 130 may be replaced by any other type of electrically-addressed intensity modulated spatial light modulator. The spatial light modulator may be either of transmission type or reflection type.

The configuration of the PAL-SLM 150 is not limited to the one described above. The PAL-SLM 150 can be replaced with any other type of optically-addressed phase modulated spatial light modulator having another configuration. The optically-addressed phase modulated spatial light modulator may be either of transmission type or reflection type.

The phase modulation module 40 may be replaced with an type of electrically-addressed phase modulated spatial light modulator, a transmission or reflection phase modulation type of liquid-crystal display, or a deformable mirror.

The reading light source 10 may be any other type of laser than a He—Ne laser. The reading light source 10 may be any other light source than a laser.

The writing light source 110 may be any other type of laser beam source than a laser diode. The writing light source 110 may be any other light source than a laser diode.

INDUSTRIAL APPLICABILITY

The present invention can be widely applied to phase modulation of light in laser process apparatuses and laser process method, hologram-reproducing patterns generator and method of generating hologram-reproducing patterns, and wave-shaping apparatus and wave-shaping method.

The invention claimed is:

1. A phase modulating apparatus comprising:
a light source that emits light;
adding means that adds a desired phase pattern and a wavefront-distortion correction phase pattern for correcting the wavefront distortion of the light in order to generate a distortion corrected phase pattern; and
an electrically-addressed phase modulated spatial light modulator that phase-modulates the light in accordance with the distortion corrected phase pattern, wherein when a sum of the desired phase pattern and the wavefront-distortion correction phase pattern has a negative value or a value equal to or more than $2\pi$, the adding means generates a remainder obtained by dividing the sum by $2\pi$ as the distortion corrected phase pattern.

2. The phase modulating apparatus according to claim 1, wherein
the wavefront-distortion correction phase pattern includes a phase pattern generated by inverting a sign of a wavefront distortion phase pattern indicating the wavefront distortion of the light.

3. The phase modulating apparatus according to claim 1, further comprising:
storing means that stores the wavefront-distortion correction phase pattern, wherein the adding means reads the wavefront-distortion correction phase pattern from the storing means and then adds the wavefront-distortion correction phase pattern to the desired phase pattern.

4. The phase modulating apparatus according to claim 1, further comprising:
input means that receives the wavefront-distortion correction phase pattern, wherein the adding means adds the received wavefront-distortion correction phase pattern to the desired phase pattern.

5. A phase modulating apparatus comprising:
a light source that emits light;
adding means that adds a desired phase pattern and a wavefront-distortion correction phase pattern for correcting wavefront-distortion of the light in order to generate a distortion corrected phase pattern;
an electrically-addressed phase modulated spatial light modulator that phase-modulates the light in accordance with the distortion corrected phase pattern;
measuring means that optically measures the wavefront distortion of the light in order to generate the wavefront-distortion phase pattern indicating the wavefront distortion; and
generating means that inverts a sign of the wavefront-distortion phase pattern in order to generate the wavefront-distortion correction phase pattern.

6. The phase modulating apparatus according to claim 5, wherein
the measuring means repeats measurement of the wavefront distortion of the light in order to generate the wavefront-distortion phase pattern that indicates the wavefront distortion;
the generating means inverts a sign of the wavefront-distortion phase pattern to generate the wavefront-distortion correction phase pattern, every time the measuring means measures the wavefront distortion of the light;
the adding means adds the wavefront-distortion correction phase pattern to the desired phase pattern in order to renew the wavefront-distortion corrected phase pattern, every time the generating means generates the wavefront-distortion correction phase pattern; and
the electrically-addressed phase modulated spatial light modulator phase-modulates the light in accordance with the renewed distortion corrected phase pattern repeatedly.

7. The phase modulating apparatus according to claim 5, wherein
the electrically-addressed phase modulated spatial light modulator has an input/output surface to receive and emit the light therethrough; and
the wavefront-distortion correction phase pattern includes a phase pattern for correcting the wavefront distortion of the light induced by the input/output surface.

8. The phase modulating apparatus according to claim 7, wherein
the wavefront-distortion correction phase pattern includes a phase pattern generated by inverting a sign of the wavefront-distortion phase pattern that indicates the wavefront distortion of the light emitted from the input/output surface of the electrically-addressed phase modulated spatial light modulator.

9. The phase modulating apparatus according to claim 5, further comprising
a first optical component that guides the light emitted from the light source to the input/output surface of the electrically-addressed phase modulated spatial light modulator; wherein
the electrically-addressed phase modulated spatial light modulator has the input/output surface which the light impinges on or emerges from,
the wavefront-distortion correction phase pattern includes a phase pattern for correcting the wavefront distortion of the light induced by at least one of the light source, the input/output surface of the electrically-addressed phase modulated spatial light modulator, and the first optical component.

10. The phase modulating apparatus according to claim 9, wherein
the wavefront-distortion correction phase pattern includes a phase pattern generated by inverting a sign of the wavefront-distortion phase pattern indicating the wavefront distortion of the light induced by at least one of the light source, the input/output surface of the electrically-addressed phase modulated spatial light modulator, and the first optical component.

11. The phase modulating apparatus according to claim 9, further comprising:
a second optical component that guides the light emerging from the input/output surface of the electrically-addressed phase modulated spatial light modulator; wherein the wavefront-distortion correction phase pattern includes a phase pattern for correcting the wavefront distortion of the light induced by at least one of the light source, the input/output surface of the electrically-addressed phase modulated spatial light modulator, the first optical component, and the second optical component.

12. The phase modulating apparatus according to claim 11, wherein the wavefront-distortion correction phase pattern includes a phase pattern generated by inverting a sign of the wavefront-distortion phase pattern indicating the wavefront distortion of the light induced by at least one of the light source, the input/output surface of the electrically-addressed phase modulated spatial light modulator, the first optical component, and the second optical component.

13. The phase modulating apparatus according to claim 9, wherein the wavefront-distortion correction phase pattern includes at least one of a first wavefront-distortion correction phase pattern for correcting the wavefront distortion induced by the input/output surface of the electrically-addressed phase modulated spatial light modulator, a second wavefront-distortion correction phase pattern for correcting the wavefront distortion induced by the light source, and a third wavefront-distortion correction phase pattern for correcting the wavefront distortion induced by the first optical component; and the adding means adds at least one of the first, second, and third wavefront-distortion correction phase patterns to the desired phase pattern in order to generate a distortion corrected phase pattern.

14. The phase modulating apparatus according to claim 13, wherein the first wavefront-distortion correction phase pattern includes a phase pattern generated by inverting a sign of a wavefront-distortion phase pattern indicating the wavefront distortion induced by the input/output surface of the electrically-addressed phase modulated spatial light modulator, the second wavefront-distortion correction phase pattern includes a phase pattern generated by inverting a sign of a wavefront-distortion phase pattern indicating the wavefront distortion induced by the light source, and the third wavefront-distortion correction phase pattern includes a phase pattern generated by inverting a sign of a wavefront-distortion phase pattern indicating the wavefront distortion induced by the first optical component.

15. The phase modulating apparatus according to claim 9, wherein a first wavefront-distortion correction phase pattern is generated by inverting a sign of a wavefront-distortion phase pattern indicating the wavefront distortion of the light induced by the input/output surface of the electrically-addressed phase modulated spatial light modulator, a fourth wavefront-distortion phase pattern is generated by inverting a sign of a wavefront-distortion correction phase pattern indicating the wavefront distortion of the light induced by the light source and the first optical component, the adding means adds the first wavefront-distortion correction phase pattern and the fourth wavefront-distortion phase pattern to the desired phase pattern in order to generate the distortion corrected phase pattern.

16. The phase modulating apparatus according to claim 5, further comprising:

input means that receives a first wavefront-distortion correction phase pattern generated by inverting a sign of a wavefront-distortion phase pattern indicating wavefront distortion of light emitted from the input/output surface of the electrically-addressed phase modulated spatial light modulator which is not driven; and storing means that stores the first wavefront-distortion phase pattern, wherein measuring means includes distortion measuring means that measures the wavefront distortion of the light induced by the light source and the first optical component in order to generate a wavefront-distortion phase pattern that indicates the wavefront distortion; and the generating means includes pattern generating means that inverts the sign of the wavefront-distortion phase pattern in order to generate the fourth wavefront-distortion correction phase pattern; wherein the adding means adds the first and the fourth wavefront-distortion correction phase patterns to the desired phase pattern in order to generate the distortion corrected phase pattern.

17. The phase modulating apparatus according to claim 16, wherein the distortion measuring means repeats measurement of the wavefront distortion of the light induced by the light source and the first optical component to repeatedly generate a wavefront-distortion phase patten indicating the wavefront distortion;

the pattern generating means inverts the sing of the wavefront-distortion phase pattern to repeatedly generate the forth wavefront-distortion correction phase pattern;

the adder means adds the repeatedly generated forth wavefront-distortion correction phase pattern and the first wavefront-distortion correction phase pattern to the desired phase pattern to repeatedly renew the wavefront-distortion corrected phase pattern;

the electrically-addressed phase modulated spatial light modulator phase-modulates the light in accordance with the repeatedly renewed distortion corrected phase pattern.

18. A phase modulating apparatus comprising:

a light source that emits light;

adding means that adds a desired phase pattern and a wavefront-distortion correction phase pattern for correcting wavefront-distortion of the light in order to generate a distortion corrected phase pattern; and an electrically-addressed phase modulated spatial light modulator that phase-modulates the light in accordance with the distortion corrected phase pattern, the electrically-addressed phase modulated spatial light modulator including a reflective type of phase modulated spatial light modulator.

19. The phase modulating method comprising:

providing a desired phase pattern;

providing a wavefront-distortion correction phase pattern for correcting a wavefront distortion of light;

adding the desired phase pattern to the wavefront-distortion correction phase pattern in order to generate a distortion corrected phase pattern; and phase-modulating the light by driving an electrically-addressed phase modulated spatial light modulator in accordance with the distortion corrected phase pattern, wherein when a sum of the desired phase pattern and the wavefront-distortion correction phase pattern has a negative value or a value equal to or more than $2\pi$, a remainder obtained by dividing the sum by $2\pi$ is generated as the distortion corrected phase pattern in the step of adding.

20. The phase modulating method according to claim 19, wherein the providing the wavefront-distortion correction phase pattern comprises:
   inverting a sign of the wavefront-distortion phase pattern indicating phase of the wavefront distortion of the light in order to generate the wavefront-distortion correction phase pattern.

21. The phase modulating method according to claim 19, wherein the providing a wavefront-distortion correction phase pattern comprises:
   receiving the wavefront-distortion correction phase pattern; wherein
   the adding includes adding the received wavefront-distortion correction phase pattern to the desired phase pattern.

22. A phase modulating method comprising:
   providing a desired pattern;
   providing a wavefront-distortion correction phase pattern for correcting a wavefront distortion of light;
   adding the desired pattern to the wavefront-distortion correction phase pattern to generate a distortion corrected phase pattern; and
   phase-modulating the light by driving an electrically-addressed phase modulated spatial light modulator in accordance with the distortion corrected phase pattern, wherein
   the providing the wavefront-distortion correction phase pattern comprises:
   measuring the wavefront distortion of the light optically and generating the wavefront-distortion phase pattern indicating the wavefront distortion; and
   inverting a sign of the wavefront distortion phase pattern in order to generate the wavefront-distortion correction phase pattern, wherein
   the adding includes adding the generated wavefront-distortion correction phase pattern to the desired phase pattern.

23. The phase modulating method according to claim 22, wherein
   the measuring includes repeating measurement of the wavefront distortion of the light in order to generate a wavefront distortion phase pattern indicating the wavefront distortion;
   the inverting includes inverting a sign of the wavefront distortion phase pattern, thereby repeatedly generating the wavefront-distortion correction phase pattern;
   the adding includes repeatedly adding the wavefront-distortion correction phase pattern, thereby repeatedly renewing the wavefront-distortion corrected phase pattern; and
   the phase-modulating includes repeatedly driving the electrically-addressed phase modulated spatial light modulator in accordance with the renewed distortion corrected phase pattern repeatedly, thereby phase-modulating the light.

24. The phase modulating method according to claim 22, wherein
   the measuring includes measuring wavefront distortion of light emitted from the input/output surface of the electrically-addressed phase modulated spatial light modulator which is not driven; and
   the inverting includes inverting the sign of a wavefront distortion phase pattern indicating the measured wavefront distortion, thereby generating a first wavefront-distortion correction phase pattern, wherein
   the adding includes adding the first wavefront-distortion correction pattern to the desired phase pattern, thereby generating the distortion corrected phase pattern.

25. The phase modulating method according to claim 22, wherein
   the providng a wavefront-distortion correction phase pattern further comprises:
   receiving a first wavefront distortion correction phase pattern obtained by inverting a sign of a wavefront distortion phase pattern indicating the wavefront distortion of the light emerging from the input/output surface of the electrically-addressed phase modulated spatial light modulator which is not driven;
   storing the first wavefront distortion correction phase pattern into the storing means;
   measuring wavefront distortion of light induced by a light source and the first optical component; and
   inverting a sign of a wavefront distortion phase pattern indicating the measured wavefront distortion, thereby generating a second wavefront-distortion correction phase pattern, wherein
   the adding includes adding the first wavefront-distortion correction phase pattern and the second wavefront-distortion correction phase pattern to the desired phase pattern, thereby the distortion corrected phase pattern, and
   the phase-modulating includes phase-modulating the light from the light source by guiding the light to the electrically-addressed phase modulated spatial light modulator through the first optical component and then driving the electrically-addressed phase modulated spatial light modulator in accordance with the distortion corrected phase pattern.

26. The phase modulating method according to claim 25, wherein
   the measuring includes repeating measurement of the wavefront distortion of the light in order to repeatedly generate a wavefront distortion phase pattern indicating the wavefront distortion;
   the inverting includes inverting a sign of the wavefront distortion phase pattern, thereby repeatedly generating the wavefront-distortion correction phase pattern;
   the adding includes repeatedly adding the wavefront-distortion correction phase pattern, thereby repeatedly renewing the wavefront-distortion corrected phase pattern; and
   the phase-modulating includes repeatedly driving the electrically-addressed phase modulated spatial light modulator in accordance with the renewed distortion corrected phase pattern repeatedly, thereby phase-modulating the light.

* * * * *